(12) United States Patent
Nakazawa et al.

(10) Patent No.: US 8,983,962 B2
(45) Date of Patent: Mar. 17, 2015

(54) QUESTION AND ANSWER DATA EDITING DEVICE, QUESTION AND ANSWER DATA EDITING METHOD AND QUESTION ANSWER DATA EDITING PROGRAM

(75) Inventors: Satoshi Nakazawa, Tokyo (JP); Takahiro Ikeda, Chiba (JP); Yoshihiro Ikeda, legal representative, Chiba (JP); Kenji Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 1376 days.

(21) Appl. No.: 11/815,621

(22) PCT Filed: Feb. 8, 2006

(86) PCT No.: PCT/JP2006/302570
§ 371 (c)(1),
(2), (4) Date: Nov. 19, 2007

(87) PCT Pub. No.: WO2006/085661
PCT Pub. Date: Aug. 17, 2006

(65) Prior Publication Data
US 2008/0195378 A1    Aug. 14, 2008

(30) Foreign Application Priority Data
Feb. 8, 2005    (JP) .................................. 2005/032379

(51) Int. Cl.
*G06F 7/00* (2006.01)
*G06F 17/30* (2006.01)

(52) U.S. Cl.
CPC ....... *G06F 17/30654* (2013.01); *Y10S 707/917* (2013.01); *Y10S 707/944* (2013.01)
USPC ........... 707/738; 707/741; 707/776; 707/917; 707/944

(58) Field of Classification Search
CPC .................................................. G06F 17/2705
USPC ......... 707/705, 706, 722, 723, 725, 726, 728, 707/731, 736, 737, 738, 740, 741, 758, 769, 707/771, 776, 780, 917, 944; 705/304
See application file for complete search history.

(56) References Cited

U.S. PATENT DOCUMENTS 5,842,221 A * 11/1998 Schmonsees .................. 707/104
6,009,271 A * 12/1999 Whatley ........................ 717/127

(Continued)

FOREIGN PATENT DOCUMENTS

| JP | 11-272584 A | 10/1999 |
| JP | 2000-339314 A | 12/2000 |

(Continued)

OTHER PUBLICATIONS

Tatsuo Oota et al., "Shitsumon Oto System no Kochiku—Joho Kyoyu/Sairiyo no Gijutsu" Fujitsu, Published by Fujitsu Ltd., Sep. 10, 1994, vol. 45, No. 5, pp. 436 to 442.

*Primary Examiner* — Marc Somers
(74) *Attorney, Agent, or Firm* — Sughrue Mion, PLLC

(57) ABSTRACT

The question and answer data editing device for editing dialog content to generate question and answer data, includes a detecting unit that detects a part of the dialog content similar to existing question and answer data stored, and a extracting unit that extracts a context in which the dialog content is made from dialog content in the proximity of the similar part detected and registers the context extracted as new question and answer data or as index information of the question and answer data.

20 Claims, 22 Drawing Sheets

(56) References Cited

U.S. PATENT DOCUMENTS

| | | | |
|---|---|---|---|
| 6,028,601 A * | 2/2000 | Machiraju et al. | 715/705 |
| 6,567,805 B1 * | 5/2003 | Johnson et al. | 707/740 |
| 6,751,621 B1 * | 6/2004 | Calistri-Yeh et al. | 707/100 |
| 6,804,670 B2 * | 10/2004 | Kreulen et al. | 707/7 |
| 6,901,394 B2 * | 5/2005 | Chauhan et al. | 706/60 |
| 7,197,460 B1 * | 3/2007 | Gupta et al. | 704/270.1 |
| 7,412,393 B1 * | 8/2008 | De Fabbrizio et al. | 704/275 |
| 7,668,889 B2 * | 2/2010 | Edwards et al. | 707/766 |
| 2001/0053977 A1 * | 12/2001 | Schaefer | 704/270.1 |
| 2002/0133355 A1 * | 9/2002 | Ross et al. | 704/275 |
| 2004/0243568 A1 * | 12/2004 | Wang et al. | 707/3 |
| 2007/0078814 A1 * | 4/2007 | Flowers et al. | 707/2 |

FOREIGN PATENT DOCUMENTS

| | | |
|---|---|---|
| JP | 2001-134575 A | 5/2001 |
| JP | 2002-230015 A | 8/2002 |
| JP | 2003-30224 A | 1/2003 |
| JP | 2003-223460 | 8/2003 |
| JP | 2003-263443 A | 9/2003 |
| JP | 2004-178123 A | 6/2004 |

\* cited by examiner

FIG. 9

DIALOGUE HISTORY DATA EXAMPLE 1 (INQUIRY ABOUT CELLULAR PHONE OPERATION)

OP: THANK YOUR FOR CALLING. THIS IS NAKAGAWA OF THE NAC CUSTOMER CENTER.
CS: EXCUSE ME, MAY I ASK YOU ABOUT A CELLULAR PHONE?
OP: YES, INQUIRY ABOUT A CELLULAR PHONE. DO YOU KNOW A MODEL NAME OF YOUR CELLULAR PHONE?
CS: WELL, N111i.
OP: N111i, RIGHT? HOW CAN I HELP YOU?
CS: I LIKE TO PREVENT PRESSING OF THE BUTTON OF THE CELLULAR PHONE WHEN NOT USED.
OP: ABOUT HOW TO OPERATE DIAL-LOCK FOR PREVENTING ERRONEOUS OPERATION, RIGHT? JUST A MOMENT.
CS: YES.
OP: THANK YOU FOR WAITING. PRESS THE BUTTON ON THE SIDE OF THE CELLULAR PHONE FOR 3 SECONDS OR MORE, YOU WILL HAVE THE DIAL LOCKED.
CS: WELL, THE BUTTON ON THE SIDE··· I HAVE TWO BUTTONS, WHICH ONE? CLOSER TO A MOUTH?
OP: POSITION OF THE SIDE BUTTON? THAT'S RIGHT, THE BUTTON CLOSER TO A CALL MOUTH.
CS: OH, I HAVE DONE IT. GOOD, THANK YOU.
OP: FOR RELEASING THE DIAL-LOCK, PLEASE PRESS THE SIDE BUTTON FOR 3 SECONDS OR MORE IN THE SAME MANNER. WHEN A PERSONAL IDENTIFICATION NUMBER IS SET, FURTHER INPUT THE FOUR-DIGIT PERSONAL IDENTIFICATION NUMBER, PLEASE.
CS: ALL RIGHT.
CS: ONE MORE THING, CAN I ANSWER THE PHONE WHILE DIAL-LOCKING?
OP: YES, BY PRESSING A CALL BUTTON, YOU CAN ANSWER THE PHONE.
CS: WELL, YES.
OP: ONLY YOU HAVE TO ONCE RELEASE THE DIAL-LOCK WHEN YOU CALL.
CS: I SEE.
OP: DO YOU HAVE ANY MORE QUESTIONS?
CS: THANK YOU FOR YOUR ASSISTANCE.
OP: THANK YOU FOR YOUR INQUIRY. NAKAGAWA OF THE NAC CUSTOMER CENTER HEARD IT.

FIG. 10

DIALOGUE HISTORY DATA EXAMPLE 2 (QUESTION ON ELECTRONIC BULLETIN BOARD)

QUESTION: HARD DISK IS NOT READABLE
    MR. ANONYM, SEPTEMBER 11, 2004

THE OTHER DAY, WHEN I REPLACED THE INTERNAL HARD DISK (C DRIVE) OF MY PERSONAL COMPUTER AT HOME WITH 160G, OS WOULD NOT BE STARTED. THE CONTENT OF THE HARD DISK IS DISK IMAGE COPY SOFTWARE WHICH IS ALREADY COPIED. WHAT IS THE PROBLEM? PLEASE GIVE ME A CLUE.

ANSWER: WHAT KIND OF HARD DISK? (Re: HARD DISK IS UNREADABLE)
    MR. IO, SEPTEMBER 12, 2004

PLEASE WRITE YOUR MODEL NAME, ENVIRONMENTS, ETC. TOGETHER WITH SUCH A QUESTION.

ANSWER: ISN'T IT THE PROBLEM OF A MOTHER BOARD AS USUAL?
    MR. kakashi, SEPTEMBER 12, 2004

SOME OF MOTHER BOARDS ARE INCOMPATIBLE WITH A LARGE CAPACITY HARD DISK CALLED BigDrive. WHY DON'T YOU CHECK. BIOS UPDATE MIGHT SOLVE THE PROBLEM IN SOME CASES.

OTHERS: THANK YOU
    MR. ANONYM, SEPTEMBER 11, 2004

YOU WERE RIGHT, MR. kakashi. BIOS HELPED START-UP. FOR YOUR REFERENCE, MY MACHINE IS NAC PC-98000. I WILL WRITE MY ENVIRONMENTS AS WELL FROM NOW ON. > MR. IO

FIG. 11

QUESTION AND ANSWER DATA EXAMPLE 3
(COLLECTION OF QUESTIONS AND ANSWERS RELATED TO CELLULAR PHONE OPERATION)

・QUESTION AND ANSWER DATA 3-1
QUESTION: HOW CAN I LOCK THE DIAL FOR PREVENTING ERRONEOUS OPERATION.
ANSWER: PRESS THE BUTTON ON THE SIDE OF THE CELLULAR PHONE FOR 3 SECONDS OR MORE.

・QUESTION AND ANSWER DATA 3-2
QUESTION: CAN I ANSWER THE PHONE WHILE DIAL-LOCKING?
ANSWER: BY PRESSING A CALL BUTTON, YOU CAN ORDINARILY ANSWER THE PHONE

INDEX EXAMPLE OF QUESTION AND ANSWER DATA EXAMPLE 3

- INDEX OF QUESTION AND ANSWER DATA 3-1
INDEX FOR SEARCH:
   (KEY WORD FOR SEARCH)    DIAL-LOCK, PREVENTION OF ERRONEOUS OPERATION, SIDE BUTTON
ASSOCIATED INDEX:    NONE
EXPRESSION PATTERN (CONTEXT/CONDITION) INDEX:  NONE

- INDEX OF QUESTION AND ANSWER DATA 3-2
INDEX FOR SEARCH:
   (KEY WORD FOR SEARCH)    DIAL-LOCK, RECEIVING CALL OPERATION, CALL BUTTON
ASSOCIATED INDEX:    NONE
EXPRESSION PATTERN (CONTEXT/CONDITION) INDEX:  NONE

SIMILAR PART DETECTION RESULT IN DIALOGUE HISTORY DATA EXAMPLE 1

OP: THANK YOUR FOR CALLING. THIS IS NAKAGAWA OF THE NAC CUSTOMER CENTER.
CS: EXCUSE ME, MAY I ASK YOU ABOUT A CELLULAR PHONE?
OP: YES, INQUIRY ABOUT A CELLULAR PHONE. DO YOU KNOW A MODEL NAME OF YOUR CELLULAR PHONE?
CS: WELL, N111i.
OP: N111i, RIGHT? HOW CAN I HELP YOU?
CS: I LIKE TO PREVENT PRESSING OF THE BUTTON WHEN NOT USED.
OP: ABOUT HOW TO OPERATE DIAL-LOCK FOR PREVENTING ERRONEOUS OPERATION, RIGHT? JUST A MOMENT.
CS: YES.
OP: THANK YOU FOR WAITING. PRESS THE BUTTON ON THE SIDE OF THE CELLULAR PHONE FOR 3 SECONDS OR MORE, YOU WILL HAVE THE DIAL LOCKED.
CS: WELL, THE BUTTON ON THE SIDE… I HAVE TWO BUTTONS, WHICH ONE? CLOSER TO A MOUTH?
OP: POSITION OF THE SIDE BUTTON? THAT'S RIGHT, THE BUTTON CLOSER TO A CALL MOUTH.
CS: OH, I HAVE DONE IT. GOOD, THANK YOU.
OP: FOR RELEASING THE DIAL-LOCK, PLEASE PRESS THE SIDE BUTTON FOR 3 SECONDS OR MORE IN THE SAME MANNER. WHEN A PERSONAL IDENTIFICATION NUMBER IS SET, FURTHER INPUT THE FOUR-DIGIT PERSONAL IDENTIFICATION NUMBER, PLEASE.
CS: ALL RIGHT.
CS: ONE MORE THING, CAN I ANSWER THE PHONE WHILE DIAL-LOCKING?
OP: YES, BY PRESSING A CALL BUTTON, YOU CAN ANSWER THE PHONE.
CS: WELL, YES.
OP: ONLY YOU HAVE TO ONCE RELEASE THE DIAL-LOCK WHEN YOU CALL.
CS: I SEE.
OP: DO YOU HAVE ANY MORE QUESTIONS?
CS: THANK YOU FOR YOUR ASSISTANCE.
OP: THANK YOU FOR YOUR INQUIRY. NAKAGAWA OF THE NAC CUSTOMER CENTER HEARD IT.

- SIMILAR TO QUESTION OF QUESTION AND ANSWER DATA 3-1
- SIMILAR TO ANSWER OF QUESTION AND ANSWER DATA 3-1
- SIMILAR TO QUESTION OF QUESTION AND ANSWER DATA 3-2
- SIMILAR TO ANSWER OF QUESTION AND ANSWER DATA 3-2

FIG. 14

| KIND OF DESCRIPTION | EXAMPLE OF EXPRESSION PATTERN |
|---|---|
| REASON | BECAUSE; SINCE; AS; BECAUSE OF; DUE TO; ON ACCOUNT OF; THEREFORE |
| OBJECT/DESIRE | LIKE TO; WANT; WISH; IF POSSIBLE; LOOK FOR |
| CONTEXT | ~ HAVE ~; ~ GET ~; MADE ~ DONE; HAVE ~ DONE |
| CONDITION | IN CASE ~; IN CASE; ~ IS REQUIRED; ONLY ~ IS REQUIRED; BUT ~ IS REQUIRED; MUST ~ |
| OPINION/EVALUATION | ~ IS BETTER; LIKE ~; ~ DIDN'T WORK |

FIG. 16

INDEX OF QUESTION AND ANSWER DATA EXAMPLE 3 (AFTER ADDITIONAL INFORMATION ACCUMULATION)

- INDEX OF QUESTION AND ANSWER DATA 3-1
  INDEX FOR SEARCH:
  　　(KEY WORD FOR SEARCH)　DIAL-LOCK, PREVENTION OF ERRONEOUS OPERATION, SIDE BUTTON
  ASSOCIATED INDEX:
  　　(ASSOCIATED QUESTION AND ANSWER)　　QUESTION AND ANSWER DATA 3-2
  EXPRESSION PATTERN INDEX:
  　　(OBJECT/DESIRE)　　"I LIKE TO PREVENT PRESSING OF THE BUTTON WHEN NOT USED."

- INDEX OF QUESTION AND ANSWER DATA 3-2
  INDEX FOR SEARCH:
  　　(KEY WORD FOR SEARCH)　DIAL-LOCK, RECEIVING CALL OPERATION, CALL BUTTON
  ASSOCIATED INDEX:
  　　(ASSOCIATED QUESTION AND ANSWER)　　QUESTION AND ANSWER DATA 3-1
  EXPRESSION PATTERN INDEX:
  　　(OBJECT/DESIRE)　　"ONLY YOU HAVE TO ONCE RELEASE THE DIAL-LOCK WHEN YOU CALL."

QUESTION AND ANSWER DATA EXAMPLE 4 (PART OF FAQ RELATED TO NAC PERSONAL COMPUTER)

・QUESTION AND ANSWER DATA 4-1
QUESTION: HARD DISK IS EXPANDABLE IN PC-98000 SERIES?
ANSWER: IN PC-98000 SERIES, 3.5″ DRIVE HAS ONE FREE BAY IN COMMON. NEW HARD DISK IS EXPANDABLE TO IT.

・QUESTION AND ANSWER DATA 4-2
QUESTION: I HAVE EXPANDED THE INTERNAL HARD DISK, BUT THE HARD DISK CAPACITY IS NOT PROPERLY RECOGNIZED. WHAT IS THE PROBLEM?
ANSWER: FOR USING A HARD DISK (BigDrive) WITH A LARGE CAPACITY OF 137 GB OR MORE IN SOME OF PC-98000 MACHINES, BIOS UPDATE OF A MOTHER BOARD IS REQUIRED. FOR MORE DETAILS, PLEASE SEE SUPPORT PAGES FOR EACH MODEL.

DIALOGUE HISTORY DATA EXAMPLE 3 (CUSTOMER ATTENDANCE ON AIR-CONDITIONER FLOOR AT ELECTRIC SHOP)

CUSTOMER: EXCUSE ME. I WANT TO ASK ABOUT AIR-CONDITIONER INSTALLATION WORK, CAN I ASK HERE?
CLERK: YES, YOU CAN. HOW CAN I HELP YOU?
CUSTOMER: WELL, I WANT TO BUY AN AIR-CONDITIONER FOR MY BASEMENT. CAN I ASK FOR INSTALLATION WORK FOR AN OUTSIDE UNIT HERE AS WELL?
CLERK: FOR A BASEMENT. WAIT A MOMENT.
CUSTOMER: YES, PLEASE

CLERK: WE ARE VERY SORRY, BUT WE DON'T HAVE AIR-CONDITIONERS FOR A BASEMENT. WE RECOMMEND YOU TO MAKE AN ORDER TO A MANUFACTURER SPECIALIZED IN IT.
CUSTOMER: IS THAT SO?
CLERK: WE USUALLY RECEIVE AN ORDER FOR OUTSIDE UNIT INSTALLATION WORK AT A SPECIAL CHARGE FROM A CUSTOMER WHO PURCHASED OUR AIR-CONDITIONER.
CUSTOMER: THE WALL OVER THERE HAS A PRICE LIST, DOESN'T IT?
CLERK: BUT WHEN YOU INSTALL AN AIR-CONDITIONER IN A BASEMENT, SPECIAL PIPING WORK IS NECESSARY AND WE INTRODUCE YOU AN EXPERT WHO CAN MAKE EXAMINATION/ESTIMATION AT SITE.
CUSTOMER: DO YOU?
CLERK: YES, WE DO. WE ARE SORRY.
CUSTOMER: WELL, WHERE CAN I MAKE CONTACT WITH AN EXPERT FOR A BASEMENT AIR-CONDITIONER?
CLERK: YES, WOULD YOU PLEASE CALL ABC PIPING SERVICE INDICATED HERE WHEN CONVENIENT?
CUSTOMER: I SEE.

FIG. 20

QUESTION AND ANSWER DATA EXAMPLE 5 (PART OF ATTENDANCE MANUAL ON AIR-CONDITIONER FLOOR AT ELECTRIC SHOP)

・QUESTION AND ANSWER DATA 5-1
QUESTION: IN A CASE WHERE OUTSIDE UNIT WORK IS REQUESTED AT THE TIME OF PURCHASE OF AN AIR-CONDITIONER.
ANSWER: TELL A CUSTOMER THAT INSTALLATION WORK IS POSSIBLE WHEN TRANSPORTING AN AIR-CONDITIONER AT A SPECIAL CHARGE. CHECK SELECTION ITEMS LISTED IN AN APPLICATION FORM 3-4 FOR WORK SUCH AS WHETHER A PIPE COVER EXISTS OR NOT AND WHETHER A BASE FOR AN OUTSIDE UNIT IS NECESSARY OR NOT.

<LIST OF PROCESSING RESULTS>

| | QUESTION AND ANSWER DATA | | | DIALOGUE HISTORY DATA | ADOPT |
|---|---|---|---|---|---|
| EDIT | QUESTION AND ANSWER DATA 3-1 | DESCRIPTION OF EXPRESSION PATTERN (OBJECT/ DESIRE) | "I LIKE TO PREVENT PRESSING OF THE BUTTON OF THE CELLULAR PHONE WHEN NOT USED." | 2004/01/24-Op41-13 MATCHING PROCESSING UNIT 6 | |
| EDIT | QUESTION AND ANSWER DATA 3-1 | ASSOCIATED QUESTION AND ANSWER DATA | QUESTION AND ANSWER DATA 3-2 | 2004/01/24-Op41-13 MATCHING PROCESSING UNIT 15 | REFERENCE ✓ |
| EDIT | QUESTION AND ANSWER DATA 3-2 | DESCRIPTION OF EXPRESSION PATTERN (CONDITION) | "ONLY YOU HAVE TO ONCE RELEASE THE DIAL-LOCK WHEN YOU CALL." | 2004/01/24-Op41-13 MATCHING PROCESSING UNIT 18 | REFERENCE ✓ |
| EDIT | QUESTION AND ANSWER DATA 5-1 | ANSWER VARIATION | "WE ARE VERY SORRY, BUT WE DON'T HAVE AIR-CONDITIONERS FOR A BASEMENT. WE RECOMMEND YOU TO MAKE AN ORDER TO A MANUFACTURER SPECIALIZED IN IT." | 2004/03/11-Op1-8 MATCHING PROCESSING UNIT 6 | REFERENCE ✓ |
| EDIT | QUESTION AND ANSWER DATA 5-1 | DESCRIPTION OF EXPRESSION PATTERN (CONDITION) | A BASEMENT, SPECIAL PIPING WORK IS NECESSARY AND WE INTRODUCE YOU AN EXPERT WHO CAN MAKE EXAMINATION/ESTIMATION AT | 2004/03/11-Op1-8 MATCHING PROCESSING UNIT 10 | |
| EDIT | NEW QUESTION AND ANSWER DATA | CANDIDATE FOR NEW QUESTION AND ANSWER DATA | QUESTION: "WELL, WHERE CAN I MAKE CONTACT WITH AN EXPERT FOR BASEMENT AIR-CONDITIONER?" ANSWER: YES, WOULD YOU PLEASE CALL ABC PIPING SERVICE INDICATED HERE WHEN CONVENIENT? | 2004/03/11-Op1-8 MATCHING PROCESSING UNIT 13 | REFERENCE |
| | | | ... | | |
| | | | ... | | |

REGISTER    CANCEL

QUESTION AND ANSWER DATA EDITING DEVICE, QUESTION AND ANSWER DATA EDITING METHOD AND QUESTION ANSWER DATA EDITING PROGRAM

TECHNICAL FIELD

The present invention relates to a question and answer data editing device for editing/adding such question and answer data prepared in advance on assumption as a collection of questions and answers, a so-called FAQ or QA collection and an attendance manual for sales and reception, and an editing method and a program therefor and, more specifically, a question and answer data editing device for determining information and arrangement of question and answer data to be added/edited by using a history of past dialogues accumulated, and an editing method and a program therefor.

BACKGROUND ART

In the operation at so-called contact center and call center which handle various inquiries and claims made to companies from customers related to products and services, there come numbers of inquires related to estimation and order of products and services, after-services and repairs every day. For an operator to answer to such an inquiry, it is very useful to prepare a collection of questions/answers generally called FAQ or QA collection in advance.

By properly referring to such a collection of questions and answers according to the content of an inquiry from a customer, an operator answering to the inquiry is allowed to make an appropriate response efficiently. In addition, since displaying a question/answer collection such as FAQ or QA collection on a home page of a corporate enables customers to solve their own problems by checking the question/answer collection, the number itself of direct inquiries by a call or mail is expected to be reduced.

Also for such operation of actually attending to a customer face to face as sales and reception, it is essential to prepare examples of responses to assumed inquiries or an attendance manual as a list of points to be noted regarding some kinds of questions. These attendance manuals can be used not only at the time of actual attendance to customers but also for training attendant operators.

Collections of questions/answers used at a contact center or a call center and attendance manuals used in sales and reception are here assumed to be data having basically the same kind of structure. These data include a question part indicative of contents and contexts of questions/inquiries and an answer part indicative of a manner of answering and points to be noted thereto. In the present specification, data edited premised on reuse will be referred to as question and answer data.

When generating such question and answer data as described above, in addition to preparation of questions and answers of abundant contents coping with various situations, it is also essential to generate an index for search such that generated question and answer data can be searched and referred to with ease.

Among techniques as related art in association with generation of these questions and answers data are, for example, Japanese Patent Laying-Open No. 11-272584 (Literature 1), Japanese Patent Laying-Open No. 2003-30224 (Literature 2) and Japanese Patent Laying-Open No. 2003-223460 (Literature 3).

Literature 1 discloses a technique targeting questions made by electronic mail to a home page on the Internet. According to this related art, together with a question of a person who browses a home page, context data indicative of a context in which a question was asked and user data indicative of an attribute of a person who browses are collected and accumulated in a data base. This enables, for example, such information as what kind of person he is who browses and with which page, the person asked a question to be found for use in improving a home page.

Also disclosed is a method of creating a QA collection on a page or date basis by sorting accumulated contents of questions on a page or date basis and generating an answer to them by an operator at the time of creating a QA collection.

Disclosed in Literature 2 is a technique for classifying a set of accumulated pairs of documents of questions and documents of answers into several non-hierarchical clusters. According to the technique, generating clusters by putting similar documents from numbers of question/answer documents together and selecting a typical question/answer document from each cluster enables use for FAQ preparation. In addition, outputting only a typical document of each cluster at the time of search of a question/answer document helps listing of search results to improve.

Literature 3 discloses a technique of holding expressions predicted to be used in customers' inquiries in linkage with their associated searching key words. To a searching key word "clogging" of a printer, for example, such expressions as "no ink fed" and "lines thin" are linked. This enables a QA collection related to "clogging" of a printer to be searched immediately when an inquiry whose content is "no ink fed" is actually made by a customer.

The above-described related art has the following problems.

First problem is that when generating question and answer data such as FAQ, no details are known of expressions actually used by a customer and a context/condition in which an individual question/inquiry is made.

Although when generating question and answer data, reports of the contents of answers actually made by an operator in response to an inquiry from a customer or records of experience contents are in general used, many of these reports/records are summary of contents of actual inquires and answers and not raw data. Therefore, in a case of a question whose content is of the same kind and which has many variations according to expressions used by a customer, such a situation can not be found from the reports/records. In addition, although questions/inquiries have their own contexts/conditions in which they are made and there are a case where an answer to the same question may vary with such contexts/conditions and a case where later reaction or selection of a customer in response to an answer may vary, it is difficult to determine such a context/condition from reports/records.

In the method of displaying accepted inquiry mail on a home page disclosed in Literature 1, situations in which inquires were made are accumulated in pair with the inquires. Target of this technique is only inquiry mail occurring when a home page is browsed and as to a situation in which an inquiry occurs, information is limited to user profile, time and date of an inquiry and a page browsed when the inquiry was made.

Disclosed in Literature 2 is a technique of putting accumulated documents of questions and documents of answers into a plurality of clusters which are highly similar to each other. Accordingly, when the clustering works well, checking documents belonging to the same cluster leads to checking expression variations whose contents are of the same kind. In general, however, clustering techniques fail to work effectively unless such conditions as formats and lengths of documents are uniform. Therefore, in a case where one question document is very short and the other question document is long and has a plurality of questions, even when they include questions of the same kind, they are not always grouped into the same cluster. Neither a context nor a condition where a question was made is found by the technique of Literature 2.

In the information provision supporting system disclosed in Literature 3, such expressions actually used by customers as "no ink fed" and "line thin" and a searching key word "clogging" are linked in advance and used at the time of searching a QA collection. This is equivalent to handling expression variations of the searching key word "clogging". It is still yet to be solved how expressions actually used by customers and expressions used in a QA collection (searching key words) are collected and how to make a determination which expression should be appropriately linked with which searching key word.

Second problem is unclearness of relationships between a plurality of question and answer data.

There often occur a case where a plurality of questions are made in a set or in series such as a case where a customer makes a plurality of inquires once and a case where a customer having made a question receives an answer to it and then makes a further question. In such a case, for creating a data base of question and answer data such as an FAQ based on such questions and inquiries, it is desirable not to accumulate data as individual question and answer data but to index the respective question and answer data as associated questions and answers. If the data is indexed as associated questions and answers, when actually attending to a customer, an operator, after searching by one question and answer, is allowed to prepare before the customer actually makes an inquiry while looking at associated questions and answers, or present information about associated questions and answers to the customer from the side of the operator before customer's asking. In addition, at the time of publicizing question and answer data as FAQ on a home page or the like, putting related question and answer data together or displaying them as a link improves browsing facility.

The related art, however, is yet to present a method of efficiently extracting a relationship between these individual question and answer data.

A first exemplary object of the present invention is to solve these problems, and to provide a question and answer data editing device capable of generating question and answer data and index information by extracting an expression pattern including a context/condition related to question and answer data or an expression variation of question and answer data from data of a history of dialogues made in the past between operators and customers, and an editing method and a program thereof.

A second exemplary object of the present invention is to provide a question and answer data editing device capable of detecting contents of a dialogue similar to question and answer data from data of a history of dialogues made in the past between operators and customers and correlating the detected contents with original question and answer data, and an editing method and a program thereof.

SUMMARY

A question and answer data editing device for editing the content of a dialogue with a customer to generate question and answer data according to a first exemplary aspect of the invention includes a unit which detects a dialogue whose content is similar to stored existing question and answer data from data of a history of the content of the dialogue with the customer, and a unit which extracts an expression pattern including a context or a condition where the dialogue was made from the proximity of the detected dialogue content and registers the extracted expression pattern as index information of the question and answer data.

A question and answer data editing device for editing the content of a dialogue with a customer to generate question and answer data according to a second exemplary aspect of the invention includes a unit which detects dialogue content similar to existing question and answer data stored from history data of the content of the dialogue with the customer, and a unit which extracts a question part or an answer part not similar to the question and answer data from the proximity of the dialogue content detected and registers the question part or answer part extracted as a variation of the question and answer data.

A question and answer data editing device for editing the content of a dialogue with a customer to generate question and answer data according to a third exemplary aspect of the invention includes a unit which detects dialogue content similar to existing question and answer data stored from history data of the content of the dialogue with the customer, and a unit which extracts the adjacent dialogue contents as associated question and answer data related to each other and registers the associated question and answer data extracted as data related to the question and answer data, when the detected dialogue content exists in plural and the plurality of dialogue contents are adjacent to each other.

A question and answer data editing device for editing the content of a dialogue with a customer to generate question and answer data according to a fourth exemplary aspect of the invention includes a unit which detects dialogue content similar to existing question and answer data stored from history data of the content of the dialogue with the customer, and a unit which extracts, from the dialogue content not detected as similar dialogue content in the history data of the dialogue content, a question part and an answer part in pair and registers the question part and answer part extracted as new question and answer data.

BRIEF DESCRIPTION OF THE DRAWINGS

FIG. 9 is a diagram showing a dialogue history data example 1 (inquiry related to cellular phone operation);

FIG. 10 is a diagram showing a dialogue history data example 2 (inquiry on electronic bulletin board);

FIG. 11 is a diagram showing a question and answer data example 3 (question and answer collection related to cellular phone operation);

FIG. 12 is a diagram showing an index example of the question and answer data example 3;

FIG. 13 is a diagram showing a similar part detection result in the dialogue history data example 1;

FIG. 14 is a diagram showing an example of an expression pattern for extracting such a description as a context/condition;

FIG. 16 is a diagram showing an example of an index (as of after additional information accumulation) of the question and answer data example 3;

FIG. 17 is a diagram showing a question and answer data example 4 (a part of FAQ related to a personal computer);

FIG. 19 is a diagram showing a dialogue history data example 3 (customer attendance on an air-conditioner floor at an electric shop);

FIG. 20 is a diagram showing a question and answer data example 5 (a part of a manual of attendance on an air-conditioner floor at an electric shop);

FIG. 22 is a diagram showing an example of a list of processing results displayed on a screen by a question and answer data editing unit.

EXEMPLARY EMBODIMENT

Next, an exemplary embodiment of the present invention will be described in detail with reference to the drawings.

Figure 1:
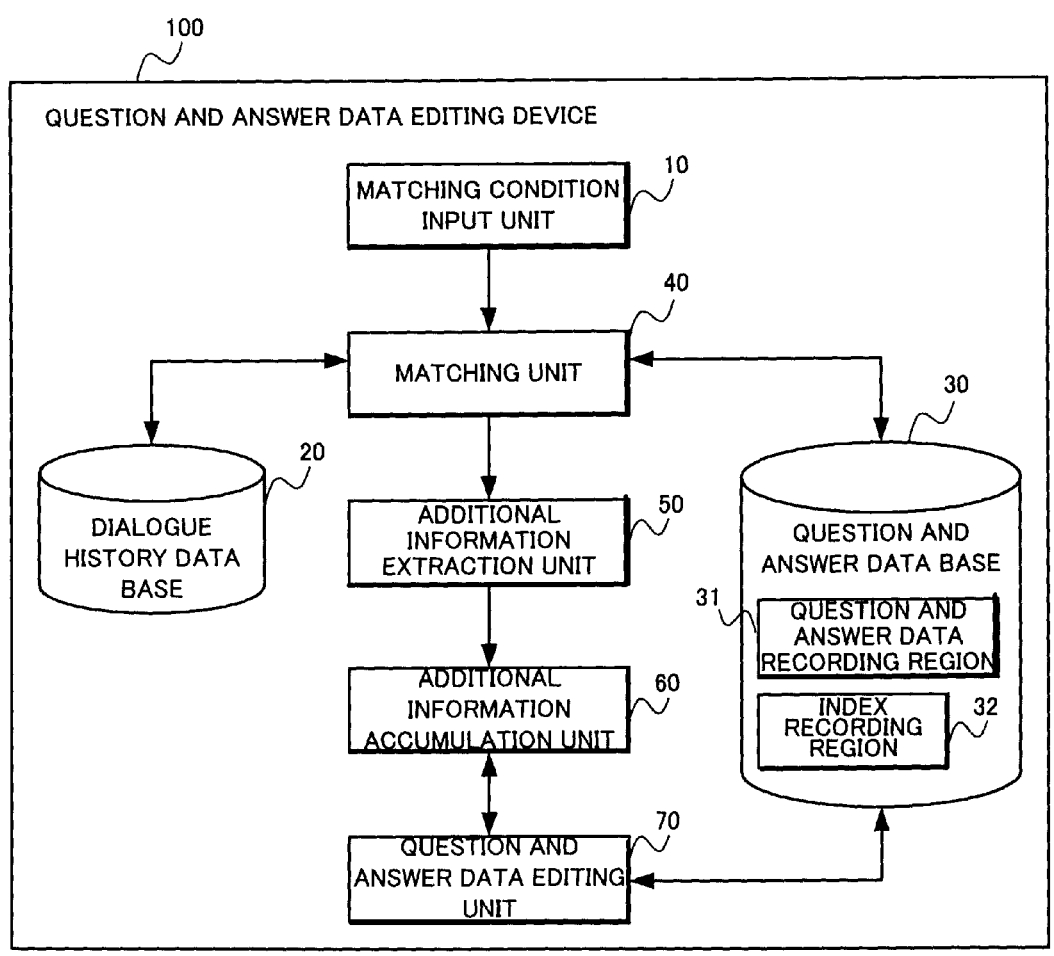
FIG. 1 is a block diagram showing an entire structure of a question and answer data editing device according to an exemplary embodiment of the present invention.

With reference to FIG. 1, a question and answer data editing device 100 according to the present exemplary embodiment of the present invention comprises a matching condition input unit 10 for inputting a condition of dialogue history data and a condition of question and answer data as targets for processing, a dialogue history data base 20 for accumulating existing dialogue contents as dialogue history data, a question and answer data base 30 for accumulating edited and generated existing question and answer data and index thereof, a matching unit 40 for executing matching processing of dialogue history data and question and answer data, an additional information extraction unit 50 for extracting information to be added to question and answer data and its index from a matching result, an additional information accumulation unit 60 for temporarily recording/accumulating extracted additional information, and a question and answer data editing unit 70 for editing accumulated additional information.

Figure 8:
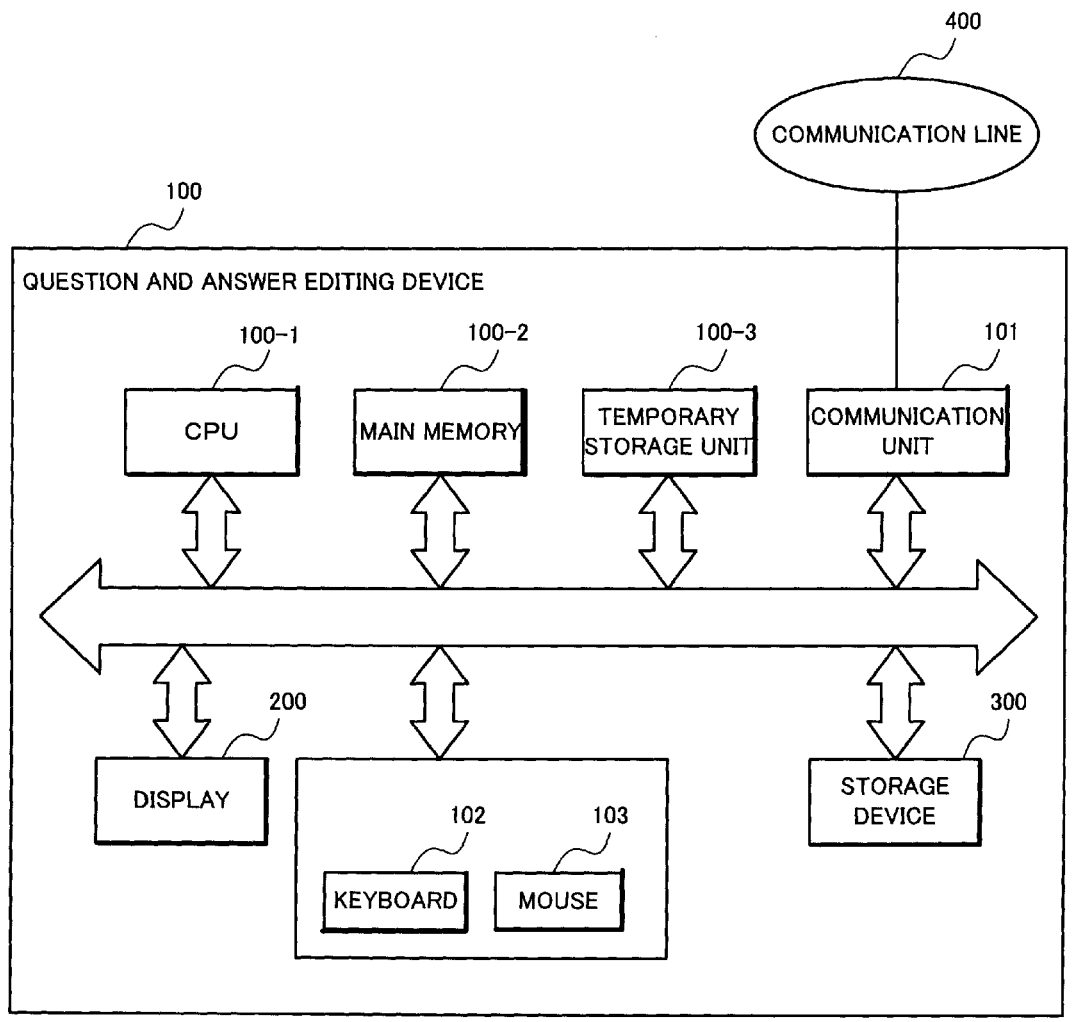
FIG. 8 is a block diagram showing a hardware structure of the question and answer data editing device according to the exemplary embodiment of the present invention.

FIG. 8 is a block diagram showing a hardware structure of the question and answer data editing device 100 as the exemplary embodiment of the present invention.

With reference to FIG. 8, the question and answer data editing device 100 comprises, as its hardware structure, a communication unit 101, a keyboard 102 and a mouse 103, a CPU 100-1 which realizes the functions of the matching unit 40, the additional information extraction unit 50 and the question and answer data editing unit 70 by the program control, a main memory 100-2 for loading and holding a question and answer data editing program, a temporary storage unit 100-3 functioning as the additional information accumulation unit 60, a display 200, and a storage device 300 such as a hard disk device which functions as the dialogue history data base 20 and the question and answer data base 30.

The communication unit 101 functions as the matching condition input unit 10 to accept a matching condition transmitted from other apparatus (terminal device etc.) through a communication line 400. The keyboard 102 and the mouse 103 also function as the matching condition input unit 10 to which a matching condition is directly input by user's operation.

The CPU 100-1 provides the functions of the matching unit 40, the additional information extraction unit 50 and the question and answer data editing unit 70 by the execution of the question and answer data editing program (application) which provides each function stored in a non-volatile memory, a DRAM and the like.

The matching condition input unit 10 has a function of designating and receiving input of, as a matching condition, a condition of dialogue history data as a target for processing and a condition of question and answer data as a target for processing as well.

The matching condition input unit 10 may be formed by a commonly used input device such as a keyboard or a mouse by which a user (manager who edits) executes direct input or can be formed by a communication means or the like which accepts and receives input of a matching condition transmitted from other apparatus (terminal device etc.) through a network or the like. Which type of device is specifically used in practice as the matching condition input unit 10 varies with environments in which the question and answer data editing device 100 is used.

Condition of dialogue history data here represents an arbitrary condition to be designated for reading individual dialogue history data accumulated in the dialogue history data base 20. When time information about when a dialogue was made is attached to each dialogue history data, for example, such a condition may be designated as taking only dialogue history data as of after a certain date as a processing target. On the other hand, when such information is attached as a scene, a context or a place where dialogue history data was recorded, such a condition may be designated as taking only dialogue history data recorded at a certain place as a target. Moreover, when time and date of last use of the question and answer data editing device 100 of the present invention is recorded, such a condition can be designated as taking only dialogue history data added thereafter as a processing target.

Similarly, a condition of question and answer data represents an arbitrary condition to be designated for reading individual question and answer data accumulated in the question and answer data base 30. When question and answer data is classified on a field or object basis, designating a field or an object as a condition enables only question and answer data for a certain object to be considered as a target for processing. On the other hand, when the number of references of individual question and answer data or the like is recorded, designating the number of references as a condition enables only data whose number of references is small or data whose number of references is large to be considered as a target for processing. Such condition designation is possible as individually designating arbitrary question and answer data to consider only designated question and answer data as a processing target.

Furthermore, in a case where it is unnecessary to designate in detail a condition of dialogue history data or question and answer data as a target for processing every time the question and answer data editing device 100 is used according to the exemplary embodiment of the present invention, a default condition may be determined in advance to automatically proceed with processing under the default condition.

The dialogue history data base 20 is a data base for preserving/accumulating existing dialogue history data. Dialogue history here represents records of a dialogue made among two or more subjective bodies. Subjects include an attendant agent other than an ordinary person. A dialogue between a person and an automatic response program is accordingly included therein. In addition, a dialogue may be made by voice such as over a telephone or through text such as facsimile or mail. Communication through a bulletin board and a chat system is also included therein. In the dialogue history data, recorded is information related to each dialogue such as a speaker, time and date, a place, a context and a condition of the dialogue according to an object or a use at the time of using the question and answer data editing device 100.

FIG. 9 shows an example 1 of dialogue history data obtained by an inquiry call related to operation of a cellular phone. In the figure, the content of operator's speech is indicated as "OP:" and the content of customer's speech is indicated as "CS:". In this example, the content of a dialogue made by an inquiry call is recorded and the recording content is converted into text data to have dialogue history data. Also recorded is whether each speech content is made by a customer or by an operator.

FIG. 10 shows a dialogue history data example 2 on an electronic bulletin board on the Internet. Recorded on the electronic bulletin board for each contribution of each article are a contributor name, date of a contribution, a title of a contribution and main text of the contribution. Each contributor is supposed to select classification of the article from among "question", "answer", "comment" and "others" at the time of a contribution (in FIG. 10, the classification is indicated on the upper left of each article). Further recorded is a relation between articles, that is, to which article a certain article directs as a hierarchical structure of threads. In such an example, a log of these records can be used as it is as dialogue history data.

Possible dialogue history data recording method are voice data, video data and the like other than text data. In such a case as electronic mail where original dialogue contents are formed as text, it can be recorded as it is as text data. In a case where an original dialogue is made by voice such as attendance by telephone or at a shop, it may be recorded as voice data or text may be created from voice or manually by using voice recognition techniques and recorded as text data. Recording in combination of a plurality of data formats is also possible such as a method of rewriting such a part of dialogue contents from voice data of the dialogue contents into text data as only an outline/key word of each dialogue or only a part of operator's speech, and recording detailed contents as voice data.

In any case of data formats used for recording dialogue history data, each dialogue history data needs to be formed into text because each data is subjected to processing of matching to question and answer data described in text by a similar part detection unit 44 or the additional information extraction unit 50 which will be described later.

Accordingly, at least a part or all of every dialogue history data should be made into text before the matching by the similar part detection unit 44 such that it can be processed as text by matching processing or information extraction processing.

In general, it is desirable to make a part or all of dialogue contents into text before each dialogue history data is accumulated in the dialogue history data base 20. This is because although matching processing might be executed a plurality of times for the same dialogue history data, if the contents have been already made into text at a time when the data is accumulated in the dialogue history data base 20, it is not necessary to make the data into text at every matching or the like.

It may be, however, a method of making contents into text every time each dialogue history data is read by a dialogue history reading unit 41 or a dialogue history division unit 42 which will be described later according to a use or an object of the question and answer data editing device 100 according to the exemplary embodiment of the present invention. At which stage making text for matching is executed exerts no effect on other parts of the structure or the procedure of the present invention. It is apparent that original dialogue contents recorded in text needs not to be made into another text.

The question and answer data base 30 is a data base for preserving/accumulating existing question and answer data which is already edited and generated. As described in the section of the Related Art, question and answer data here represents text data formed of a question part indicative of contents and contexts of questions/inquiries and an answer part indicative of a method of answering thereto and points to be noted such as a question and answer collection used when attending to a customer at a contact center, a call center or the like and an attendance manual used in sales/reception or the like.

Although question and answer data is expressed as "question" and "answer" for convenience' sake, contents of the data are not necessarily questions or answers in the strict sense of ordinary Japanese. In the following, examples of question and answer data will be shown.

First Example of Question and Answer Data

Question: "in a case where a customer gets angry with a loud voice"

Answer: "First, see how the customer is to determine a reason of rage. Also pay attention not to make other customers feel anxious. Move to other place when necessary and listen to the customer's talk seriously at any rate."

As shown in the above-described question and answer data example 1, "question" describes a simple context and "answer" describes only points to be noted/how to handle. Thus, contents of attendance to a customer which fail to take a form of question and answer in the strict sense are also included in the question and answer data.

It is apparent that as shown in a subsequent question and answer data example 2, a pair of a question and an answer in the original sense is included in the question and answer data.

Second Example of Question and Answer Data

Question: "My personal computer seems to be affected by a virus, what shall I do?"

Answer: "First, when the personal computer is connected to a network, plug off from the network line immediately. Don't turn off the power. Then, install anti-virus software to scan my computer."

The question and answer data base 30 comprises a question and answer data recording region 31 for recording question and answer data and an index recording region 32 for recording an index for searching question and answer data. The question and answer data recording region 31 is a part for recording the above-described question and answer data itself. The index recording region 32 holds meta information of each question and answer data such as an index for search composed of searching key words for searching question and answer data and expression variations, an associated index indicative of a relationship among a plurality of question and answer data and an expression pattern (context/condition) index indicative of an expression pattern including contexts and conditions in which question and answer data effectively holds. What kind of index is to be specifically used varies with a use and an object, and a format of question and answer data of the question and answer data editing device 100 according to the exemplary embodiment of the present invention.

FIG. 11 shows a question and answer data example 3 related to operation of a cellular phone. Such question and response data itself as question and answer data 3-1 or question and answer data 3-2 illustrated in FIG. 11 is recorded in the question and answer data recording region 31.

On the other hand, FIG. 12 shows examples of indexes for the question and answer data 3-1 and the question and answer data 3-2 in FIG. 11. These are indexes generated from a word and description contents included in each question and answer data when a generator of the question and answer data generates the question and answer data 3-1 and the question and answer data 3-2. Such an index is recorded in the index recording region 32 so as to correspond to each question and answer data.

The matching unit 40 has a function of matching dialogue history data read from the dialogue history data base 20 and question and answer data read from the question and answer data base 30 to detect a part similar to question and answer data from the dialogue history data.

Figure 2:
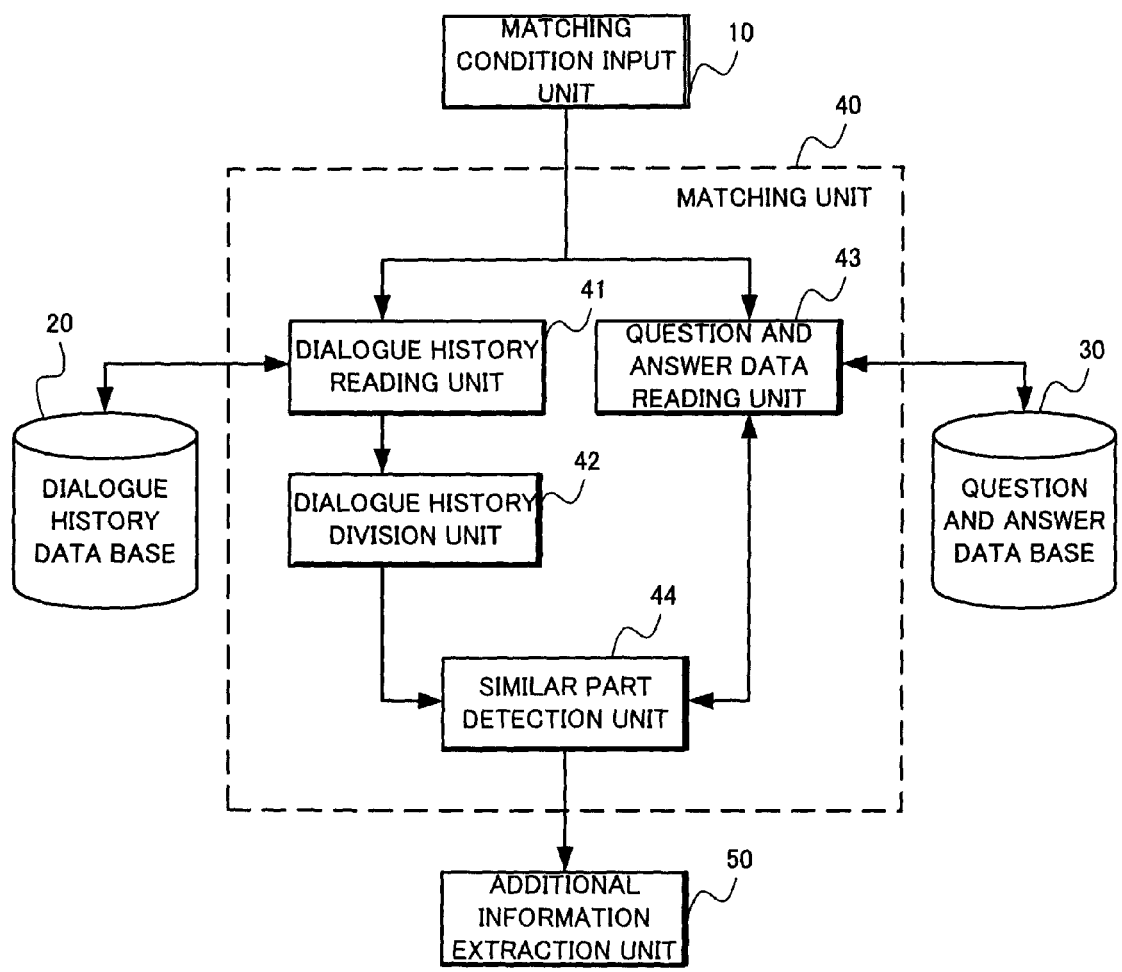
FIG. 2 is a block diagram showing a structure of a matching unit of the question and answer data editing device according to the exemplary embodiment of the present invention.

The details of the matching unit 40 are shown in FIG. 2. The matching unit 40 comprises the dialogue history reading unit 41, the dialogue history division unit 42, a question and answer data reading unit 43 and the similar part detection unit 44.

The dialogue history reading unit 41 reads all the dialogue history data satisfying conditions of dialogue history input through the matching condition input unit 10 from the dialogue history data base 20 and transfers the same to the dialogue history division unit 42.

The dialogue history division unit 42 analyzes dialogue history data received from the dialogue history reading unit 41, divides each dialogue content into a plurality of matching processing units (a range of dialogue contents subjected to matching processing) and transfers the units to the similar part detection unit 44. Then, the similar part detection unit 44 makes determination of a similar part on a divided matching processing unit basis.

By what a matching processing unit each dialogue content is to be divided varies with a use and an object at the time of using the question and answer data editing device 100 according to the exemplary embodiment of the present invention, a format and a kind of dialogue history data accumulated and a similar part detection method used in the similar part detection unit 44.

As the simple method, each dialogue content may be divided on a speech basis to make an individual speech be a matching processing unit. The content can be divided not by each speech but by every time a speaker switches, and used as a matching processing unit. In a case where each speech is short and has the content of a dialogue in which a plurality of speeches by one or more speakers form one topic or one set, a period of a topic is detected by using a topic detection technique by natural language processing to section the dialogue content by each topic and take the sectioned content as a matching processing unit. In a case, for example, where an operator repeats and confirms the content of speeches made by a customer in a dialogue at a call center after putting the contents together without fail, a speech part for the operator to confirm can be taken out by an expression pattern matching technique or the like and taken as a matching processing unit.

The question and answer data reading unit 43 reads all the question and answer data satisfying a condition of question and answer data input through the matching condition input unit 10 from the question and answer data base 30 and transfers the same to the similar part detection unit 44.

The similar part detection unit 44 checks all the dialogue history data received from the dialogue history division unit 42 on a matching processing unit basis to determine whether there exists in the dialogue history data a part similar to a question part or an answer part of the question and answer data received from the question and answer data reading unit 43.

The determination of a similar part is made for combinations between all the matching processing units of all the received dialogue history data and all the received question and answer data and when a similar part is detected in the dialogue history data, a matching processing unit is marked so as to find later of which question and answer data the matching processing unit is similar to a question part or an answer part. More specifically, a matching processing unit and a question part or an answer part of the question and answer data similar to the matching processing unit are correlated by marking.

When determination is made that one matching processing unit is similar to a plurality of different question and answer data, one question and answer data having the highest similarity may be selected and only the selected question and answer data may be marked. It is also possible to select all the question and answer data whose similarity is more than a fixed value and mark their matching processing units.

For the determination of a similar part by the similar part detection unit 44, a similar document determination technique in natural language processing can be used. Already known as similar document determination techniques are, for example, a method of finding coincidence of a word occurrence vector in two documents whose similarities are to be compared, a method of finding coincidence in an expression pattern, a method of comparing a connection between words and a hybrid method which combines a plurality of methods. According to a use or an object at the time of using the question and answer data editing device 100 of the exemplary embodiment of the present invention and further according to a format or a kind of dialogue history data accumulated or an existing question and answer data writing format, an appropriate similar document determination technique can be used. Since these similar document determination techniques are known techniques, their detailed description will be omitted.

As to these similar document determination techniques in natural language processing, there exists, for example, a technique recited in Literature 4*(Takenobu Tokunaga and Jun-ichi Tsujii (editor), Language and Calculation (5) Information Search and Language Processing, Tokyo University Publication Society; ISBN: 4130654055).

FIG. 13 shows an example of a result obtained by executing similar part detection processing with respect to the dialogue history data example 1 illustrated in FIG. 9 and the question and answer data example 3 illustrated in FIG. 11 by the similar part detection unit 44. In this example, each one speech included in the dialogue history data example 1 shown in FIG. 9 is simply divided as a matching processing unit. In the result of the similar part detection shown in FIG. 13, a rectangular balloon on the left side indicates that a question part or an answer part of question and answer data similar to the matching processing unit is marked. In this case, similar parts are determined by whether coincidence in an occurring word vector exceeds a certain threshold value or not in a matching processing unit of dialogue history data and a question part or an answer part of question and answer data.

The additional information extraction unit 50 extracts question and answer data to be newly added or index information of question and answer data from a detection result of a part similar in dialogue history data to existing question and answer data which is processed by the matching unit 40.

Figure 3:
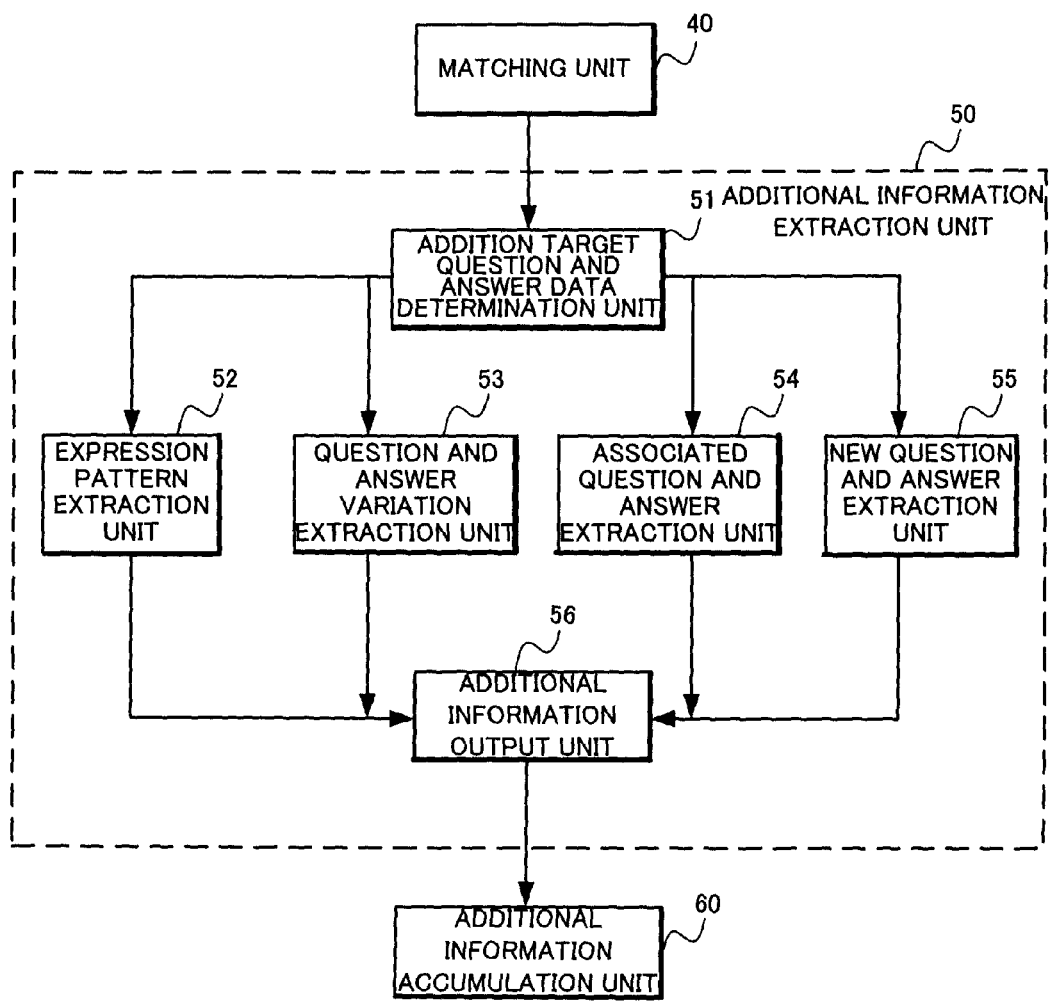
FIG. 3 is a block diagram showing a structure of an additional information extraction unit of the question and answer data editing device according to the exemplary embodiment of the present invention.

Details of the additional information extraction unit 50 are shown in FIG. 3. The additional information extraction unit 50 comprises an addition target question and answer data determination unit 51, an expression pattern extraction unit 52, a question and answer variation extraction unit 53, an associated question and answer extraction unit 54, a new question and answer extraction unit 55 and an additional information output unit 56.

The addition target question and answer data determination unit 51 checks each one of dialogue history data received from the matching unit 40 on a matching processing unit basis to find whether there exists a mark given by the similar part detection unit 44.

When a matching processing unit is marked, the addition target question and answer data determination unit 51 determines question and answer data determined to be similar to the matching processing unit as an addition target from/to which index information is to be newly extracted/added and sends the dialogue history data and a position of the marked matching processing unit to the expression pattern extraction unit 52, the question and answer variation extraction unit 53 and the associated question and answer extraction unit 54. When a plurality of pieces of different question and answer data are marked on one matching processing unit, consider all the marked question and answer data as addition targets from/to which index information is newly extracted/added.

When no mark is found on a matching processing unit, send currently checked dialogue history data and a position of a matching processing unit to the new question and answer extraction unit 55.

With respect to a position of a marked matching processing unit, the expression pattern extraction unit 52 searches for existence, in proximity to the dialogue history data, of a description which recites an expression pattern including a context, a condition or the like of the contents described in the matching processing unit and when a description exists, extracts a description part reciting the expression pattern.

Here, among descriptions reciting expression patterns including a context, a condition and the like are, for example, expressions reciting a reason such as "because" and "since ~", expressions reciting an object/desire such as "like to ~", "wish" and "look for ~", expressions reciting a context such as "xx gets ○○" and "made xx ○○", expressions reciting a condition such as "in case~, ~ is required", "only ~ is required" and "must~" and expressions reciting opinion/evaluation such as "xx better" and "like ○○". For finding parts reciting these expressions from dialogue history data, usable is such an already known technique of extracting information from text as a method of extracting, with such expression patterns as described above prepared in advance, a description part adapted to an expression pattern in dialogue history data.

FIG. 14 shows examples of expression patterns for extracting a description part reciting a context/condition or the like from dialogue history data at the expression pattern extraction unit 52. The expression pattern extraction unit 52 extracts a matching processing unit including a description matching such an expression pattern as shown in FIG. 14 from dialogue history data.

While when matching an expression pattern, a method may be used of simply checking coincidence of a character string, when a conjugation of a verb or an adjective is included in an expression pattern, a method may be used of conjugating and expanding the end of a conjugation in such an expression pattern to check coincidence with an expression in dialogue history data.

On the other hand, when a certain matching processing unit includes description parts reciting a plurality of kinds of contexts/conditions and the like, any one of the description parts may be selected based on the degree of adaptability to an expression pattern or with priority given to a kind of description in advance, one description part may be selected according to the priority. It is also possible, not to select one, to extract description parts of an expression pattern reciting a plurality of kinds of contexts/conditions or the like from a matching processing unit.

As other information extraction techniques than that shown in FIG. 14 in which a list of expression patterns is prepared, there is a method, with numbers of documents prepared for learning to which right answers are given in advance such as which sentence recites a reason and which sentence recites an opinion/evaluation, of checking a statistical amount such as n grams of words in the documents for learning to execute machine learning and determining a kind of new document based on the learning result.

As these information extraction techniques, there exist, for example, the technique recited in Literature 5*(Satoshi Sekine, Information Extraction—Arrange and Present Information—, Information Processing, Vol. 45, No. 4, June 2004, p 563-578).

Which description should be in practice extracted as a description reciting an expression pattern is determined in advance according to a use or an object at the time of using the question and answer data editing device 100 according to the exemplary embodiment of the present invention or the nature of existing dialogue history data or question and answer data recorded in the data base.

Also as to up to where from a matching processing unit regarded as a reference position should be regarded as its proximity to search for a description reciting an expression pattern, it is determined in advance according to a use or an object at the time of using the question and answer data editing device 100 according to the exemplary embodiment of the present invention or the nature of existing dialogue history data or question and answer data recorded in the data base. Possible examples of a range of the proximity to be searched are that obtained by a method of tracing back dialogue history data from a matching processing unit as a reference position to set a range before a matching processing unit marked preceding to the reference position (when no mark is found, up to the top of the dialogue history data) and that obtained by a method of setting a fixed range as the proximity such as searching a range of several speeches (e.g. five speeches) preceding to and succeeding a matching processing unit as a reference position.

When a description reciting an expression pattern is found in proximity to a matching processing unit as a reference position, record a kind of description such as "reason" or "object/desire" and send information such as a position of the description, description contents and a matching processing unit as a reference position in combination to the additional information output unit 56.

Figure 15:
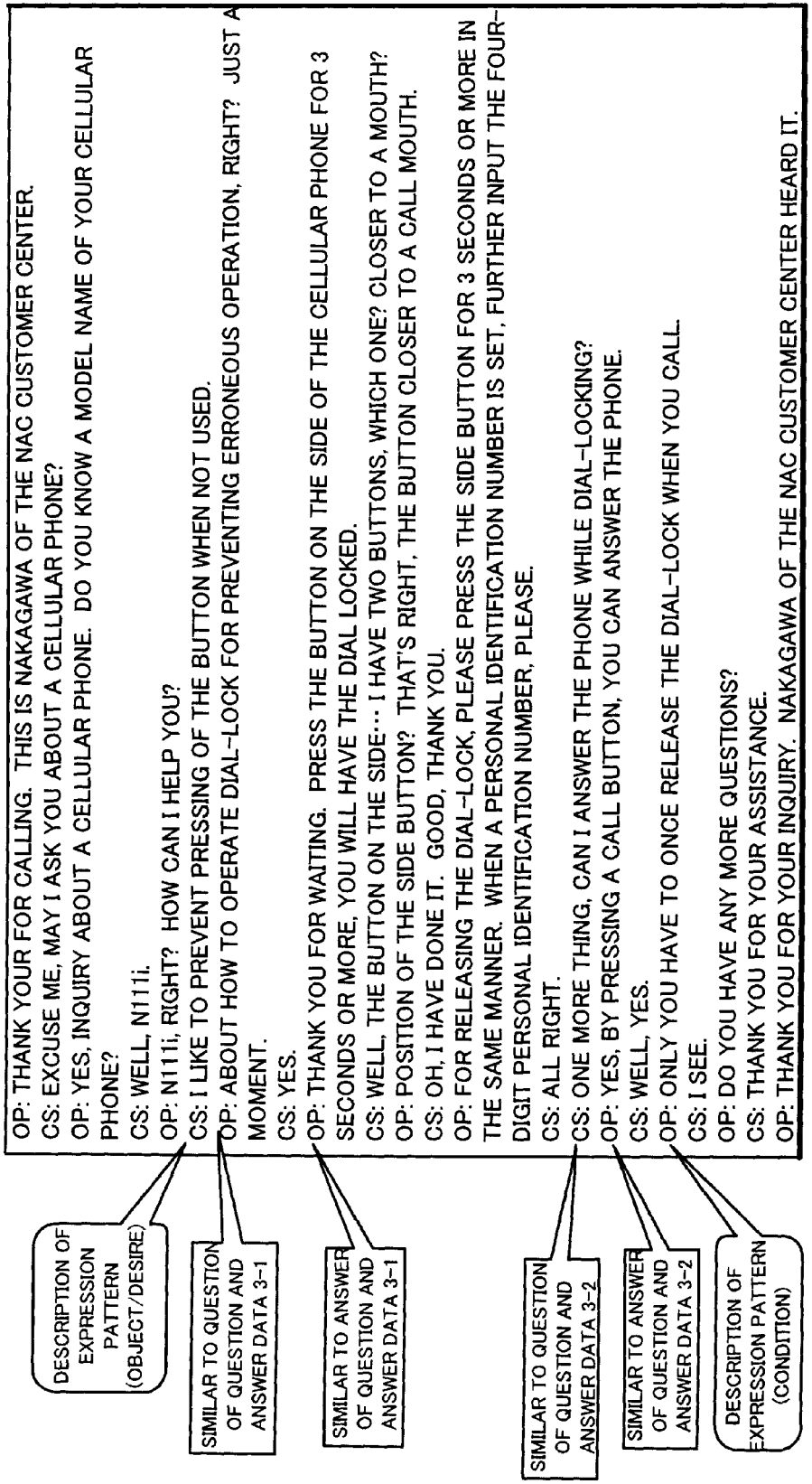
FIG. 15 is a diagram showing an extraction result of a description of an expression pattern in the dialogue history data example 1.

FIG. 15 shows an example of a result obtained by extracting a description of an expression pattern (context/condition etc.) from the dialogue history data example 1 illustrated in FIG. 9 by using the expression patterns shown in FIG. 14 by means of the expression pattern extraction unit 52. In the figure, a speech indicated in a round balloon represents a description of an expression pattern (context/condition etc.) extracted.

The description of an object/desire shown first in FIG. 15 is one extracted as a result of coincidence with an expression pattern "like to ~" when a range of a proximity set to be preceding and succeeding two speeches is searched with a matching processing unit similar to the question of the question and answer data 3-1 as a reference. Since the matching processing unit as a reference is marked with "similar to a question of the question and answer data 3-1", the question and answer data determined by the addition target question and answer data determination unit 51 is the "question and answer data 3-1", so that the description of an object/desire is put together as additional information for the "question and answer data 3-1" by the additional information output unit 56 which will be described later.

The subsequent description of a condition shown in FIG. 15 is one extracted as a result of coincidence with an expression pattern "only, ~ is required" when search is executed with a matching processing unit similar to an answer of the question and answer data 3-2 as a reference. Since the matching processing unit as a reference is marked with "similar to an answer of the question and answer data 3-2", the question and answer data determined by the addition target question and answer data determination unit 51 is the "question and answer data 3-2", so that the description of a condition is put together as additional information for the "question and answer data 3-2" by the additional information output unit 56 which will be described later.

The question and answer variation extraction unit 53 first checks whether a marked matching processing unit is similar to a question part or an answer part of question and answer data determined to be similar by the similar part detection unit 44 (hereinafter the question and answer data will be referred to as reference question and answer data).

In the following, description will be separately made of a case where the unit is similar to a question part and a case where the same is similar to an answer part.

(1) In Case of Being Similar to Question Part

When a marked matching processing unit is similar to a question part, with a position of the marked matching processing unit as a reference, check the contents of the dialogue history data on a matching processing unit basis toward the end of the dialogue history data (toward a direction of a speech made after the reference position).

First, when a matching processing unit similar to an answer part of reference question and answer data is found, it is sent to the additional information output unit 56 that there exists no question and answer variation. When a matching processing unit similar to a question part of question and answer data other than the reference question and answer data is first found or when nothing is found until the end of the dialogue history data, it is similarly sent to the additional information output unit 56 that there exists no question and answer variation.

First, when a matching processing unit similar to an answer part of other question and answer data than the reference question and answer data is found or when a matching processing unit which can be determined to describe some answer or another although similar to none of question and answer data (without mark) is found, determine that it is a variation of answer data of the reference question and answer data to send a combination of the matching processing unit at the reference position, the position of the found matching processing unit and the answer contents to the additional information output unit 56.

For determining whether a certain matching processing unit descries an answer or not here, the above-described technique of extracting information from text can be used such as, with a list of frequently used expression patterns for answers prepared in advance including "please do ~", "we would like you to do ~", "we will tell you how to ~", "please try ~" and "we recommend ~", extracting a part in which a string of more than a fixed number of characters coincides with such expression patterns.

Which expression should be in practice extracted as a part describing an answer is determined in advance according to a use or an object at the time of using the question and answer data editing device 100 according to the exemplary embodiment of the present invention or the nature of existing dialogue history data or question and answer data recorded in the data base.

(2) In Case of Being Similar to Answer Part

On the other hand, when a matching processing unit at a reference position is similar to an answer part of reference question and answer data, check the contents of the dialogue history data on a matching processing unit basis toward the top of the dialogue history data (toward a direction of a speech made before the reference position).

First, when a matching processing unit similar to a question part of the reference question and answer data is found, it is sent to the additional information output unit 56 that there exists no question and answer variation. When a matching processing unit similar to an answer part of question and answer data other than the reference question and answer data is first found or when nothing is found until the top of the dialogue history data, it is similarly sent to the additional information output unit 56 that there exists no question and answer variation.

First, when a matching processing unit similar to a question part of question and answer data other than the reference question and answer data is found or when a matching processing unit which can be determined to describe some question or another although similar to none of question and answer data (without mark) is found, determine that it is a variation of question data of the question and answer data example 3 to send a combination of the matching processing unit at the reference position, the position of the found matching processing unit and the question contents to the additional information output unit 56.

For determining whether a certain matching processing unit descries a question or not here, the above-described technique of extracting information from text can be used such as, with a list of frequently used interrogation expression patterns for questions prepared in advance including "how can I ~?", "I don't know ~", "tell me ~", "where ~?", "to where ~?", "what shall I do~?", "what is the problem?" and "how much ~?", extracting a part in which a string of more than a fixed number of characters coincides with such expression patterns.

Which expression should be in practice extracted as a part describing a question is determined in advance according to a use or an object at the time of using the question and answer data editing device 100 according to the exemplary embodiment of the present invention or the nature of existing dialogue history data or question and answer data recorded in the data base.

Thus, the question and answer variation extraction unit 53 extracts a variation of question data or a variation of answer data of question and answer data to which a matching processing unit at a reference position is similar from dialogue history data in the proximity to the reference position and sends the variation to the additional information output unit 56. When there exist a plurality of pieces of question and answer data to which the matching processing unit at the reference position is similar, execute the above-described processing with respect to each question and answer data.

Figure 18:
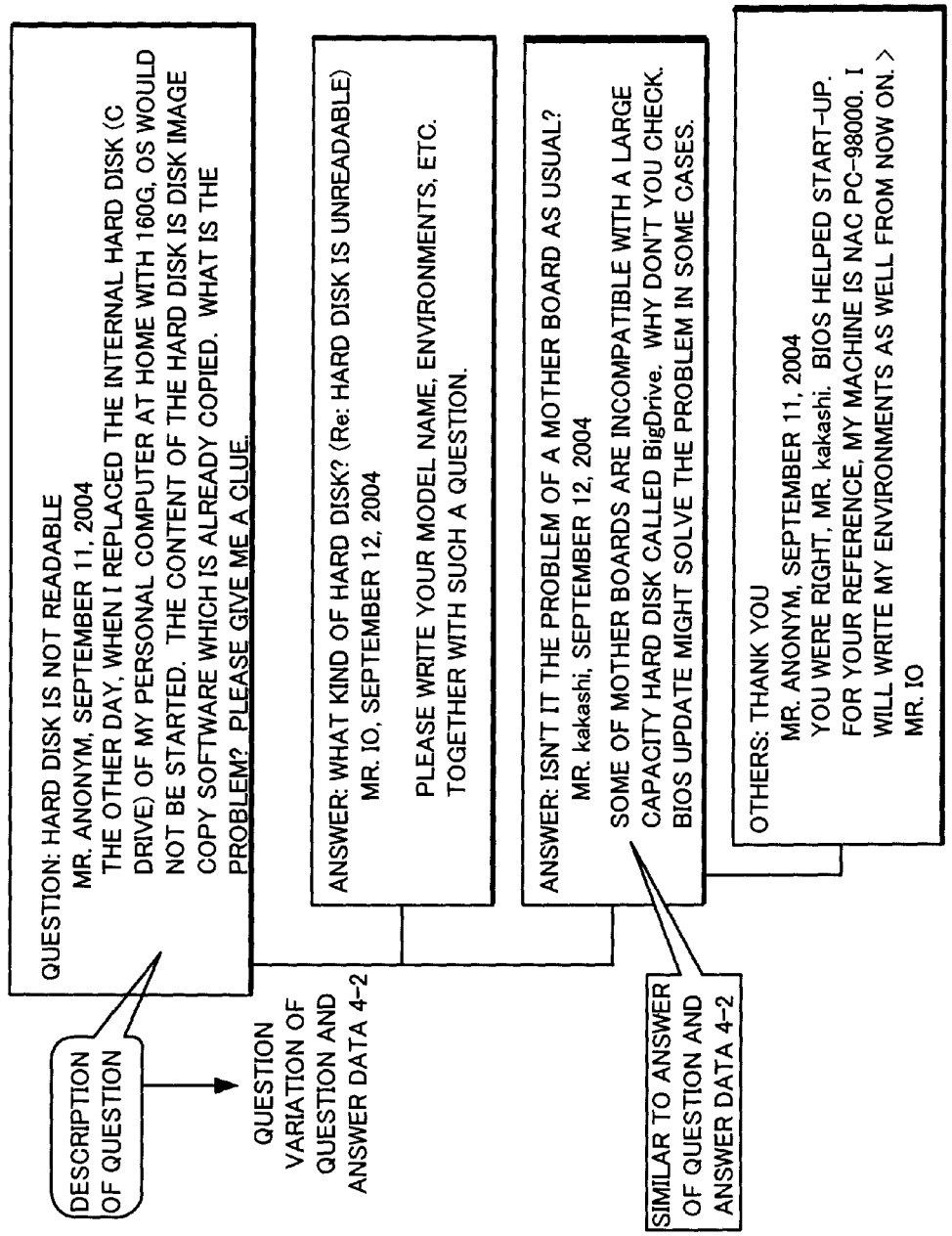
FIG. 18 is a diagram showing a question and answer variation extraction result in the dialogue history data example 2.

FIG. 18 shows a question and answer variation extraction result obtained when matching the dialogue history data example 2 of FIG. 10 with such a question and answer data example 4 as shown in FIG. 17. In this example, one article on the electronic bulletin board is assumed to be one matching processing unit. In addition, while on the electronic bulletin board, articles are managed on a tree along threads or the like in some cases, the articles in this example are considered to be dialogue history data having one-dimensional sequence in the order of time when an article is contributed.

In FIG. 18, the third article from the top in the figure is marked as "similar to an answer of question and answer data 4-2" by the similar part detection unit 44 because of coincidence in words used.

Accordingly, when a matching processing unit of the third article is checked by the addition target question and answer data determination unit 51, the question and answer data 4-2 is determined as question and answer data as a target for addition from/to which index information is to be newly extracted/added and this dialogue history data and the position of the marked matching processing unit are sent to the expression pattern extraction unit 52, the question and answer variation extraction unit 53 and the associated question and answer extraction unit 54.

Since the matching processing unit as a reference has a mark as being similar to the answer of the question and answer data, the question and answer variation extraction unit 53 searches the front part of the dialogue history data to determine that the first article is "a description of a question" as a result and extracts the article as a variation of question data of the question and answer data 4-2. In this example, while the first article is determined to be "a description of a question" from expression patterns in the article such as "what is the problem?" and "tell me", when each article has information attached in advance about whether it is a "question" or an "answer" as in the dialogue history data example 2 in FIG. 17, determination may be made whether each article is "a description of a question" or "a description of an answer" by using the information.

Although in the question and answer data 4-2 of the question and answer data example 4 in FIG. 17, described as a situation causing "BIOS update of mother board is required" is only a case of "expanded the internal hard disk" in a question part, such a question and answer variation extraction result as shown in FIG. 18 finds that in practice, even when "the internal hard disk (C drive) of a personal computer is replaced with 160 GB", BIOS update is required. Accordingly, a user of the question and answer data editing device 100 is allowed to update the question and answer data 4-2 by confirming the extraction result by the question and answer data editing unit 70 which will be described later.

Figure 21:
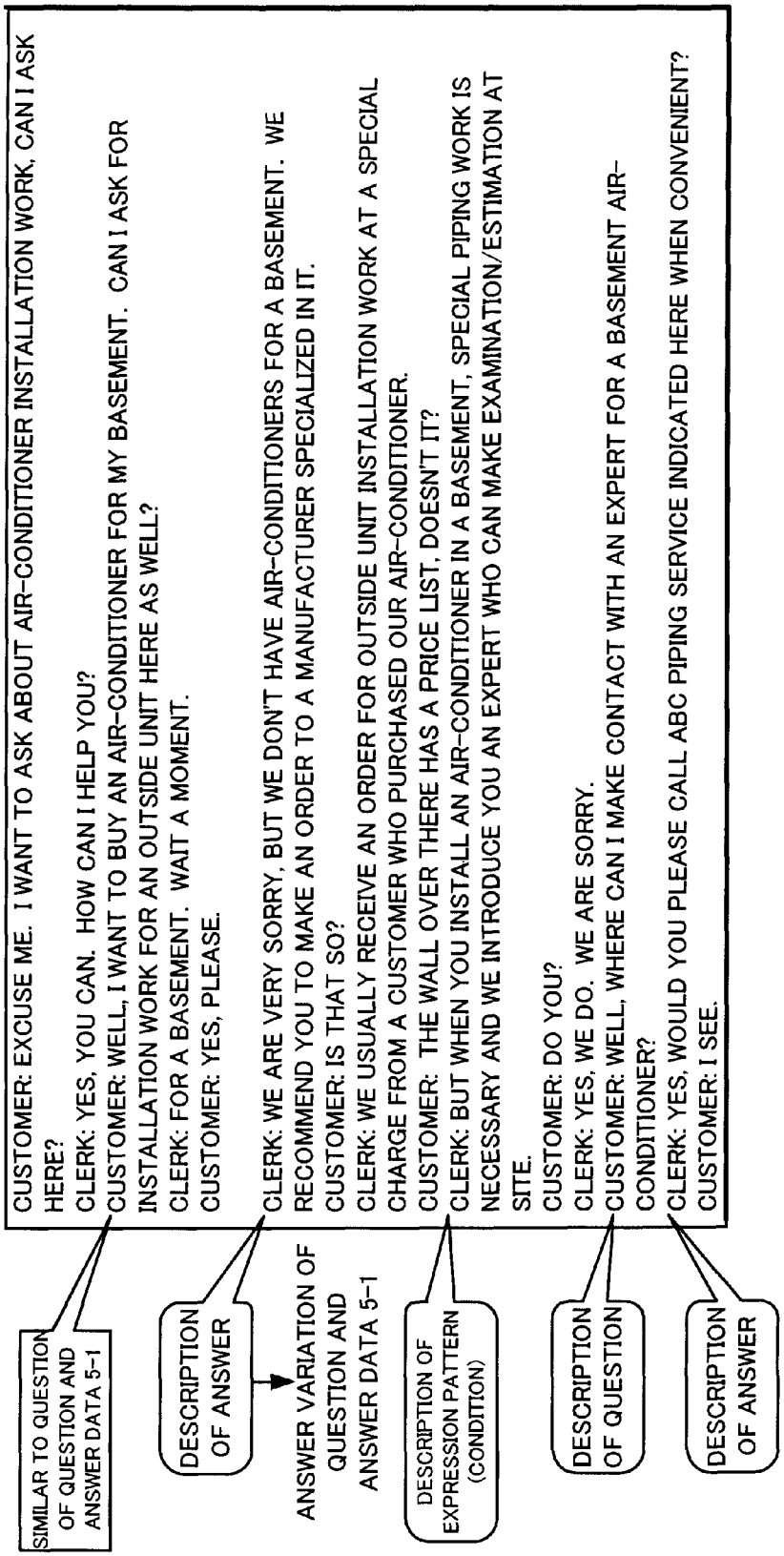
FIG. 21 is a diagram showing a processing result obtained by the additional information extraction unit in the dialogue history data example 3.

Similarly, FIG. 21 shows a question and answer variation extraction result obtained when a dialogue history data example 3 in FIG. 19 is matched to such a question and answer data example 5 as shown in FIG. 20. The dialogue history data example 3 is premised on dialogue contents obtained by automatically recording a dialogue between a customer and a clerk on an air-conditioner floor at an electric shop through a microphone attached to the clerk and rewriting the dialogue. In FIG. 19, a sentence with "customer" written at the top represents a customer's speech part and a sentence with "clerk" written at the top represents a clerk's speech part. In this dialogue history data example 3, assume that each speech is divided as a matching processing unit by the dialogue history division unit 42.

In FIG. 21, the third speech from the top in the figure is marked as "similar to a question of question and answer data 5-1" by the similar part detection unit 44 because of coincidence in words used.

Accordingly, when the matching processing unit of the third speech is checked by the addition target question and answer data determination unit 51, the question and answer data 5-1 is determined as question and answer data as a target for addition from/to which index information is to be newly extracted/added and this dialogue history data and the position of the marked matching processing unit are sent to the expression pattern extraction unit 52, the question and answer variation extraction unit 53 and the associated question and answer extraction unit 54.

Since the matching processing unit as a reference has a mark as being similar to the question of the question and answer data, the question and answer variation extraction unit 53 searches the rear part of the dialogue history data to determine that the sixth speech of the clerk from the top is "a description of an answer" as a result and extracts the speech as a variation of answer data of the question and answer data 5-1. In this example, the speech is determined to be "a description of an answer" from an expression pattern in the sixth speech "recommend".

Although in the question and answer data 5-1 of the question and answer data example 5 in FIG. 20, described are only "in a case where outside unit installation work is requested at the purchase of an air-conditioner" and "installation work is possible when transporting an air-conditioner at a special charge". Such a question and answer variation extraction result as shown in FIG. 21 finds that in practice, "order to an expert" is required in some cases. Accordingly, a user of the question and answer data editing device 100 is allowed to update the question and answer data 5-1 by confirming the extraction result by the question and answer data editing unit 70 which will be described later. Hereafter, as long as the clerk checks an attendance manual as question and answer data edited and generated by the exemplary embodiment of the present invention, an error of receiving a request for work for an outside unit of an air-conditioner for underground use can be prevented.

The associated question and answer extraction unit 54 extracts a relationship that in dialogue history data, subsequently to certain question and answer data (a similar part thereof), another question and answer data (a similar part thereof) appears and sends question and answer data appearing in succession to the additional information output unit 56 as associated question and answer data.

More specifically, in a case where question and answer data (assumed to be reference question and answer data) to which a marked matching processing unit is similar is similar to an answer part of the question and answer data, check the rear part of the dialogue history data with the marked matching processing unit as a reference position. In a case where a matching processing unit similar to a question part of question and answer data (assumed to be the question and answer data 2) other than the reference question and answer data is first found in the rear, the reference question and answer data and the question and answer data 2 are sent to the additional information output unit 56 as associated question and answer data. In other cases, nothing is executed. When question and answer data as the reference question and answer data and the question and answer data 2 exist in the plural, all the combinations of the respective question and answer data are sent to the additional information output unit 56 as associated question and answer data.

In the example shown in FIG. 13, a matching processing unit "similar to a question of the question and answer data 3-2" is found in the rear of a matching processing unit "similar to an answer of the question and answer data 3-1". Accordingly, a combination between the question and answer data 3-1 and the question and answer data 3-2 is sent to the additional information output unit 56 as associated question and answer data.

The new question and answer extraction unit 55 determines whether an unmarked matching processing unit received from the addition target question and answer data determination unit 51 is not existing question and answer data but new question and answer data or not.

The new question and answer extraction unit 55 first determines whether the received matching processing unit without a mark describes a question or not. When the unit describes a question, further check the rear of the dialogue history data and when an unmarked matching processing unit which describes an answer is found before a marked matching processing unit is found, send a combination of positions and description contents of the first matching processing unit and the matching processing unit whose answer description is found to the additional information output unit 56 as a new question and answer data candidate. In other cases, nothing is sent to the additional information output unit 56.

For determining whether a matching processing unit is describing a question or an answer, the already known technique of extracting information from text which has been used in the question and answer variation extraction unit 53 can be used.

In the dialogue history data example 3 shown in FIG. 21, since a third speech from the bottom is a matching processing unit without a mark, it is sent to the new question and answer extraction unit 55. The new question and answer extraction unit 55 first determines that the received third speech from the bottom is "a description of a question" because of coincidence in an expression pattern "where". As a result of further check of the rear part of the dialogue history data, a second speech from the bottom is determined to be a matching processing unit without a mark before a marked matching processing unit is found and to be "a description of an answer" because of coincidence in an expression pattern. Accordingly, a pair of the found third and second speeches from the bottom is sent to the additional information output unit 56 as a candidate for new question and answer data.

The additional information output unit 56 receives the information (a description of expression patterns including contexts/conditions and the like, a question and answer variation, associated question and answer data) sent from the expression pattern extraction unit 52, the question and answer variation extraction unit 53 and the associated question and answer extraction unit 54, puts the information together as index information of the question and answer data determined by the addition target question and answer data determination unit 51 and sends the obtained information to the additional information accumulation unit 60. When information targeting a plurality of pieces of different question and answer data is sent, the respective pieces of information are put together on a target question and answer data basis and sent to the additional information accumulation unit 60.

In particular, when with respect to certain one question and answer data, information which is the extraction of such a description as an expression pattern and a question and answer variation are found in one dialogue history data, since the reason of occurrence of the question and answer variation different from existing question and answer data might be recited in the description of the expression pattern, the information as the extraction of the description of the expression pattern and the question and answer variation can be sent in combination as index information to the additional information accumulation unit 60.

Assume, for example, that the sixth speech from the bottom in FIG. 21 is extracted as "a description of a condition" of the third speech from the top by the expression pattern extraction unit 52. On the other hand, as has been mentioned in the description of the question and answer variation extraction unit 53, the sixth speech from the top in response to the third speech from the top is extracted as an answer variation of the question and answer data 5-1. In such a case, the sixth speech from the bottom may be combined, as a condition for causing the answer variation of the question and answer data 5-1, together with these speeches into index information.

In addition, as a candidate for question and answer data to be newly added, the description contents of a new question and a new answer received from the new question and answer extraction unit 55 are sent to the additional information accumulation unit 60 as a combination between the question and answer description contents and information about from which position of which dialogue history data the contents are extracted.

The additional information accumulation unit 60 temporarily accumulates/records information sent from the additional information output unit 56. When accumulating information, it can be recorded separately for each question and answer data targeted by index information. It can be also recorded separately for each kind of index information. Candidate for question and answer data to be newly added is recorded separately from the index information.

Information accumulated in the additional information accumulation unit 60 is output in response to a request from the question and answer data editing unit 70 which will be described later. Also in response to a request from the question and answer data editing unit 70, a part or all of the accumulated information is erased.

FIG. 16 shows an example in which as a result of processing of the dialogue history data example 1 by the expression pattern extraction unit 52 and the associated question and answer extraction unit 54 as shown in FIG. 15, index information is added. In FIG. 16, the question and answer data 3-1 and the question and answer data 3-2 are linked to each other as associated question and answers as compared with FIG. 12. This enables, when referring to one question and answer data, the other to be presented as associated question and answer data or enables search from one to the other. In addition, a description of an expression pattern extracted by the expression pattern extraction unit 52 is added as index information.

A user of the question and answer data editing device 100 according to the exemplary embodiment of the present invention is allowed to present and confirm the index information and appropriately execute update such as addition/modification to/of original question and answer data as required by using the function of the question and answer data editing unit 70 which will be described later. In addition, expressions used in these descriptions enable search of the question and answer data 3-1 and the question and answer data 3-2 hereafter.

The question and answer data editing unit 70, which is a device having a function of executing editing/addition processing (update) of question and answer data, is capable of accessing the additional information accumulation unit 60 and the question and answer data base 30. The question and answer data editing unit 70 has a function of displaying and outputting index information and a candidate for new question and answer data accumulated in the additional information accumulation unit 60 on a screen, a function of rectifying the contents of displayed index information and candidate for new question and answer data as output and a function of additionally registering index information at the question and answer data index 32 of the question and answer data base 30 and additionally registering a candidate for new question and answer data at the question and answer data recording region 31 of the question and answer data base 30.

When index information accumulated in the additional information accumulation unit 60 is output as display on the screen in response to a request from a user, the user operates the question and answer data editing unit 70 to confirm the displayed index information and appropriately executes rectification work of the contents and additional registration at the index recording region 32 of the question and answer data base 30 as required.

The user also confirms a candidate for new question and answer data accumulated in the additional information accumulation unit 60 to appropriately execute rectification work of its contents and additional registration of the new question and answer data at the question and answer data recording region 31 of the question and answer data base 30 as required.

FIG. 22 shows an example of a list of processing results (display of index information and new question and answer data) presented on the screen by the question and answer data editing unit 70.

In the display example shown in FIG. 22, additional information (index information and new question and answer data) extracted from dialogue history data by the additional information extraction operation is listed up for each question and answer data.

Indicated in the section of "dialogue history data" is from which dialogue history data the extracted additional information is obtained.

By clicking a "reference" button provided in this section by a mouse or the like, original dialogue history data is displayed on other screen (window).

In addition, when clicking an "edit" button provided in each row by a mouse or the like, an edit screen on which rectification is made to individual additional information extracted is displayed.

Section of "adopt" provided corresponding to each row on the right end is a section for designating whether corresponding additional information should be registered at the question and answer data base 30 or not, in which section, checking additional information determined to be registered by a user designates the information as a target to be registered.

Pressing a "register" button on the lower right of the screen leads to registration of additional information whose "adopt" section is checked at the question and answer data recording region 31 or the index recording region 32 of the question and answer data base 30.

It may be set to automatically delete the contents registered at the question and answer data base 30 from the additional information accumulation unit 60.

In addition, it may be set such that when information is found to satisfy conditions set in advance without user's confirmation of information (index information or a candidate for new question and answer data) accumulated in the additional information accumulation unit 60, the information is automatically registered at the question and answer data base 30.

Possible setting as a condition of automatic registration at the question and answer data base 30 is a case where as many or more pieces of index information of the same kind for one question and answer data are extracted as or than a fixed number.

As to the matching condition input unit 10, the dialogue history data base 20, the question and answer data base 30, the matching unit 40, the additional information extraction unit 50, the additional information accumulation unit 60 and the question and answer data editing unit 70 which the question and answer data editing device 100 according to the present exemplary embodiment comprises, providing a computer device that the question and answer data editing device 100 comprises with a program (application) which realizes the functions of the respective units through a machine-readable recording medium such as CD-ROM or a flexible disk, or a network such as the Internet and executing the program on the computer device allows the computer device to be structured to have the above-described respective functions.

Next, operation of the question and answer data editing device 100 according to the exemplary embodiment of the present invention will be described along the flow charts of FIG. 4 to FIG. 7.

Figure 4:
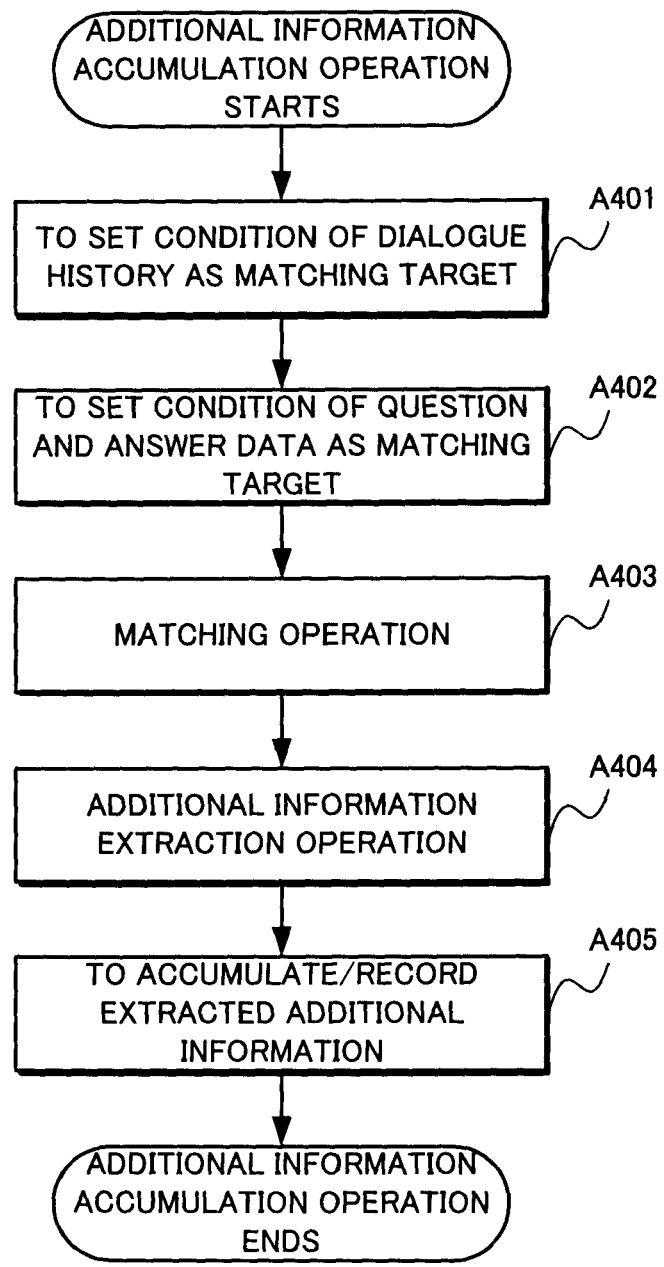
FIG. 4 is a flow chart showing additional information accumulation operation at the question and answer data editing device according to the exemplary embodiment of the present invention.
Figure 7:
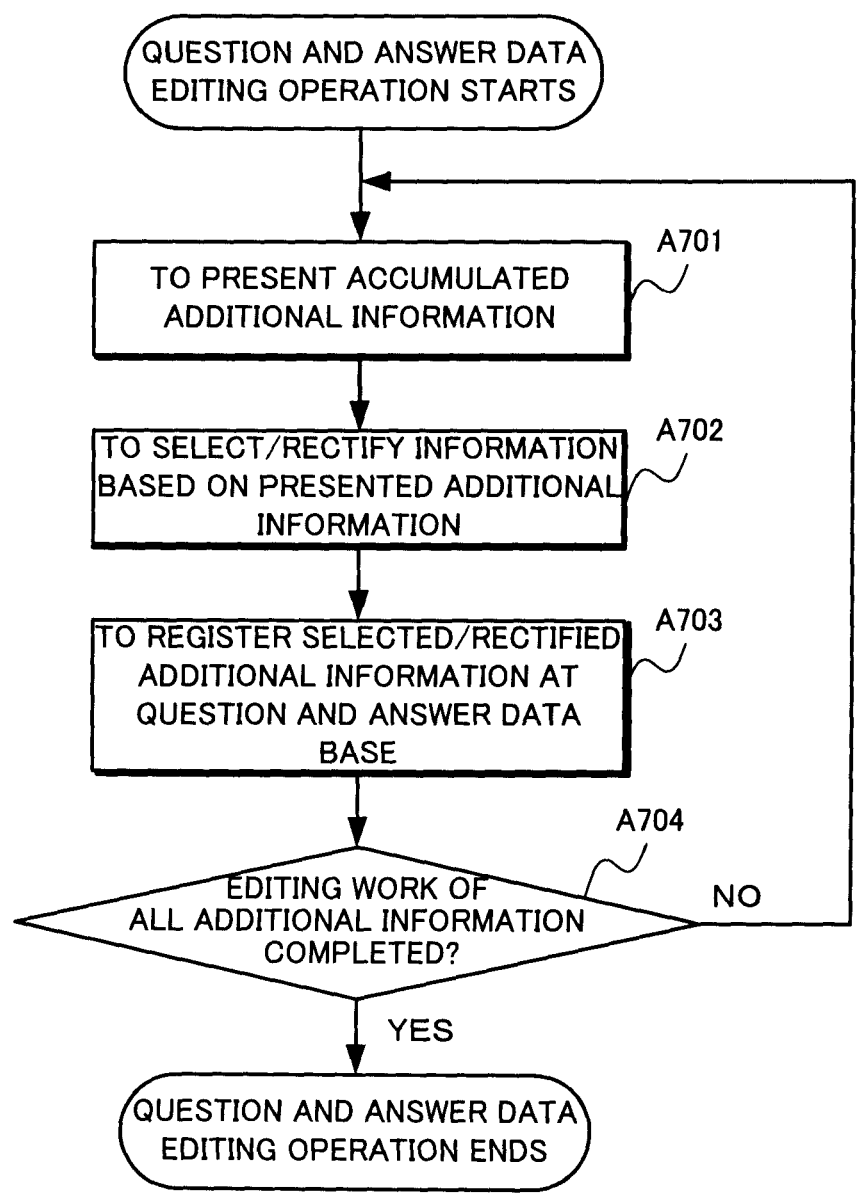
FIG. 7 is a flow chart showing question and answer data editing operation according to the exemplary embodiment of the present invention.

Operation at the question and answer data editing device 100 according to the exemplary embodiment of the present invention is roughly composed of two operations, the additional information accumulation operation shown in FIG. 4 and the question and answer data editing operation shown in FIG. 7. The two operations are executable independently.

First, the additional information accumulation operation will be described along the flow chart of FIG. 4.

In the additional information accumulation operation of the question and answer data editing device 100 according to the exemplary embodiment of the present invention, by means of the matching condition input unit 10, a user sets and inputs a condition of dialogue history data to be a target for processing this time among dialogue history data recorded in the dialogue history data base 20 (Step A401).

The user also inputs a condition of question and answer data to be a target for processing this time among question and answer data recorded in the question and answer data base 30 (Step A402). Either of these Steps A401 and A402 can be processed first.

Subsequently, the matching unit 40 executes operation of matching dialogue history data and question and answer data satisfying the conditions input at Steps A401 and A402 (Step A403).

Figure 5:
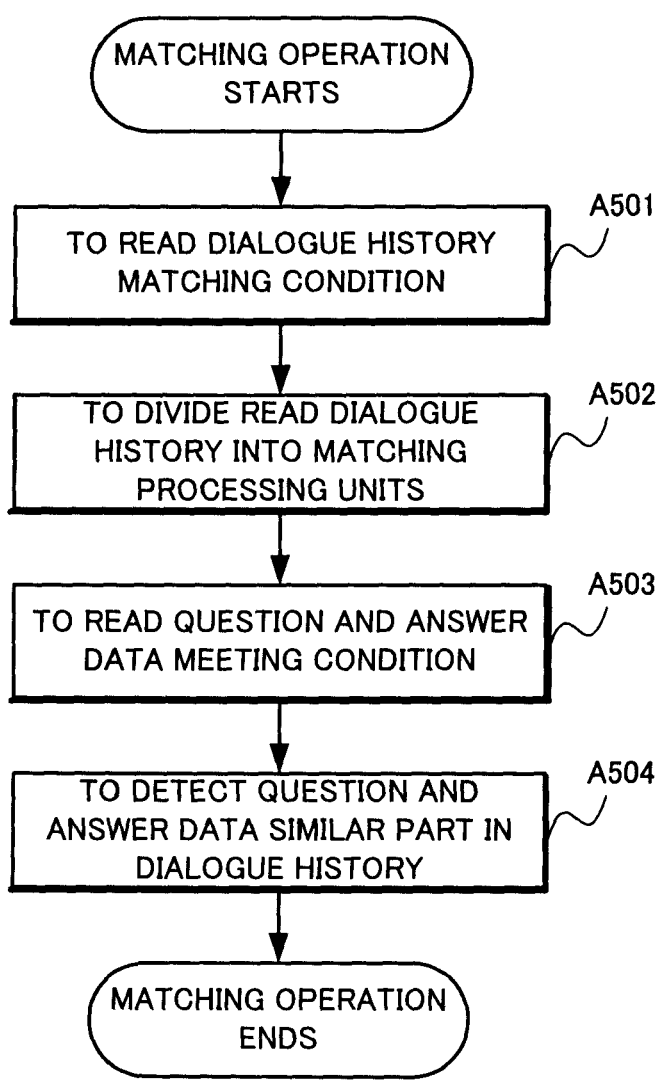
FIG. 5 is flow chart showing matching operation at the question and answer data editing device according to the exemplary embodiment of the present invention.
Figure 6:
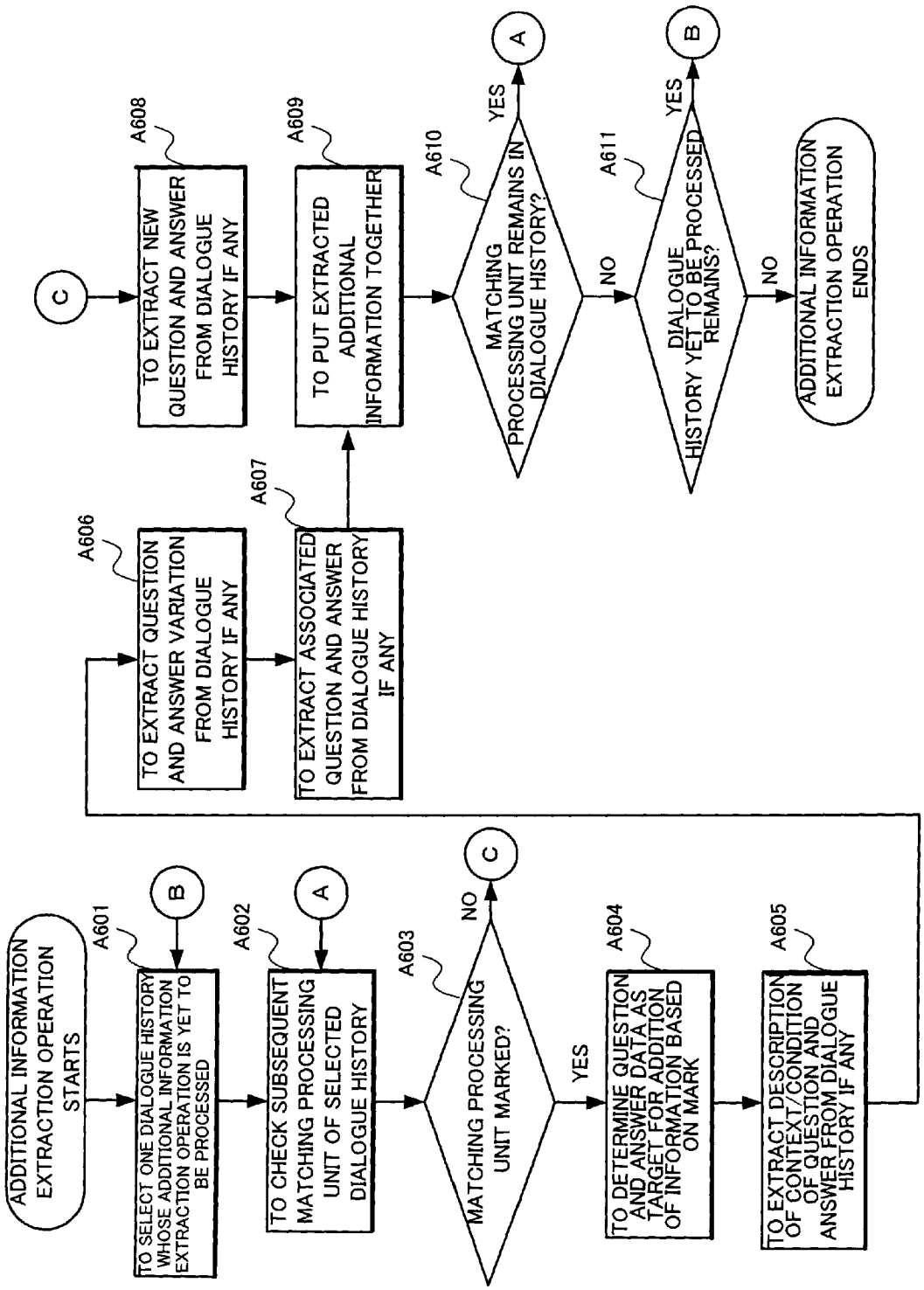
FIG. 6 is a flow chart showing addition information extraction operation at the question and answer data editing device according to the exemplary embodiment of the present invention.

As to the matching operation, description thereof will be made in more detail with reference to the flow chart of FIG. 5.

In the matching operation of the matching unit 40, first read dialogue history data satisfying the condition (Step A501) and then divide the read dialogue history data into appropriate matching processing units (Step A502). Also read question and answer data coincident with the condition (Step A503). While Steps A501 and A502 should be here processed in this order, Step A503 can be executed independently of the processing of Steps A501 and A502.

Next, check all the dialogue history data satisfying the condition on a matching processing unit basis to determine whether there exists a part similar to a question part or an answer part of the question and answer data satisfying the condition. As a result, when a similar part is detected in the dialogue history data, mark a matching processing unit to know later in which question and answer data, the matching processing unit is similar to a question part or an answer part (Step A504). With the processing, the matching operation ends.

After the matching operation, based on the result of detection of the part in the dialogue history data similar to the existing question and answer data which is obtained by the matching operation, the additional information extraction unit 50 executes additional information extraction operation of extracting question and answer data to be newly added or index information of the question and answer data (Step A404). As to the additional information extraction operation, more detailed description will be made thereof with reference to the flow chart of FIG. 6.

In the additional information extraction operation by the additional information extraction unit 50, select one dialogue history data whose additional information extraction operation is yet to be processed (Step A601). Next, sequentially check matching processing units of the selected dialogue history data (Step A602) to confirm marking indicative of a result of the matching operation on the matching processing unit (Step A603).

When marked, determine question and answer data as a target to which information to be extracted is added from the mark (Step A604).

Subsequently, when a description of an expression pattern exists in proximity to the marked matching processing unit as a reference in the dialogue history data, extract the description (Step A605).

Also check whether question and answer data to which the marked matching processing unit is similar has both a question part and an answer part existing in proximity to the relevant part in the dialogue history data and when only either one exists adjacent to another answer or question, extract a description of the answer or the question as a variation of the original question and answer data (Step A606).

Furthermore, when in the dialogue history data, at a part of the marked matching processing unit, two question and answer data exist in succession, extract these question and answer data as associated question and answer (Step A607).

Here, Step A605, Step A606 and Step A607 can be executed independently. Only a part of Step A605, Step A606 and Step A607 may be executed according to a use or an exemplary object of the exemplary embodiment of the present invention.

On the other hand, when no mark is attached at Step A603, check whether before a position of the matching processing unit of the dialogue history data, there exist a description of a question and a description of an answer which are not similar to the existing question and answer data or not and when they exist, extract them as candidates for new question and answer data (Step A608).

When the processing at Step A605 to A607 or the processing at Step A608 is completed, put additional information (if existing) extracted by the processing together (Step A609).

Next, check whether there remains a matching processing unit whose procedures at Steps A603 to A609 are yet to be processed in currently selected dialogue history data and when it remains, return to Step A602. When there remains no relevant matching processing unit, proceed to Step A611 (Step A610).

When there remains no matching processing unit yet to be processed in the currently selected dialogue history data, check whether there remains other dialogue history data whose additional information extraction operation is yet to be processed or not and when it remains, return to Step A601. When there remains none, end the additional information extraction operation (Step A611).

After the additional information extraction operation, accumulate/record information added therein in the additional information accumulation unit 60 (Step A405). When the processing at Step A405 is completed, out of the operation at the question and answer data editing device 100 according to the exemplary embodiment of the present invention, the additional information accumulation operation ends.

Next, question and answer data editing operation by the question and answer data editing unit 70 will be described along the flow chart shown in FIG. 7.

In the question and answer data editing operation, to a user of the exemplary embodiment of the present invention, present index information of the existing question and answer data and a candidate for new question and answer data which are accumulated in the additional information accumulation unit 60 by the additional information accumulation operation (Step A701). The index information and the candidate for new question and answer data are presented to a user as display on the screen as illustrated in the example of FIG. 22.

As to the index information and the candidate for new question and answer data presented at Step A701, the user selects information to be registered at the question and answer data base 30 to rectify its contents as required (Step A702).

Then, the index information and the new question and answer data selected or the index information and the new question and answer data rectified at Step A702 are registered at the question and answer data base 30 (Step A703).

Subsequently, check whether the work at Steps A702 and A703 is completed with respect to all the additional information and when there remains additional information yet to be completed, return to Step A701. When there remains no additional information yet to be completed, end the question and answer data editing operation (Step A704).

Although the description is made here that at Step A702, the user selects additional information to be registered at the question and answer data base 30, part or all of the question and answer data editing operation may be automatically registered with a basis for addition/registration to/at the question and answer data base 30 separately settled among additional information accumulated in the additional information accumulation unit 60 by the additional information accumulation operation.

As described in the foregoing, processing the additional information accumulation operation and the question and answer data editing operation independently once or more leads to the end of the entire operation at the question and answer data editing device according to the exemplary embodiment of the present invention.

The foregoing described question and answer data editing device 100 according to the exemplary embodiment of the present invention attains the following effects.

First, since a part similar to question and answer data is detected from accumulated dialogue history data and a description of an expression pattern including a context/condition and the like is extracted from the proximity of the part and recorded as index information of the question and answer data, an expression pattern including a context/condition and the like as of when the question and answer data is used in an actual dialogue can be registered as an index of the question and answer data.

By recording an extracted expression pattern including a context/condition and the like in linkage with original question and answer data, the pattern can be used as index information for use in searching question and answer data. Also when editing/adding question and answer data, the pattern can be used as reference information. Possible is a use such as counting extracted expression patterns including a context/condition and the like and, for example, when finding that certain question and answer data is frequently used under a certain context/condition, newly adding question and answer data with the context/condition included.

Secondly, since a part similar to a question part or an answer part of question and answer data is detected from accumulated dialogue history data, and a description of a question or an answer not similar to the original question and answer data is extracted from the proximity of the part and recorded as index information of the question and answer data, a variation of an expression of a question part or an answer part as of when question and answer data is used in an actual dialogue can be extracted.

By recording an extracted expression variation in linkage with original question and answer data, the variation can be used as index information used for searching question and answer data. Also recording a variation of question and answer data in pair with an expression pattern including a context/condition and the like as of when the question and answer data is used enables their records to be used when the question and answer data is segmented into cases according to a context/condition or the like.

Thirdly, since similar parts of two question and answer data appearing in succession in accumulated dialogue history data are detected and these question and answer data are recorded in index information as associated question and answer data, question and answer data which is likely to appear in succession in the same dialogue when the question and answer data is used in an actual dialogue can be extracted.

Recording these highly related question and answer data in linkage with each other in their index information enhances facility in search and browsing. Also when question and answer data is displayed in groups, such data can be used as reference information for grouping.

Fourthly, since successive descriptions of a question and an answer not similar to existing question and answer data are extracted from accumulated dialogue history data and the descriptions of the question and the answer are recorded as candidates for new question and answer data, new question and answer data different from the existing question and answer data can be extracted from the dialogue history data. Newly editing/adding new question and answer data to the question and answer data base makes question and answer data be better.

The present invention attains the first exemplary object of the present invention by extracting an expression pattern including a context or a condition where a dialogue corresponding to question and answer data was made or an expression variation of the question and answer data from existing dialogue history data and taking the extraction as additional information of the original question and answer data.

Being thus structured, the present invention also attains the second exemplary object of the present invention by extracting a plurality of question and answer data detected in one dialogue history data as associated questions and answers.

The question and answer data editing device, the editing method and the program thereof according to the present invention obtain the following effects.

First, expression patterns including contexts, conditions and the like in which question and answer data is used in an actual dialogue can be registered as index information of the question and answer data.

The reason why the first effect is obtained is that a part similar to the question and answer data is detected from accumulated dialogue history data to extract a description of an expression pattern including a context, a condition and the like from the proximity of the part and record the extracted description as index information of the question and answer data.

Secondly, variations of expressions of a question part or an answer part used when question and answer data is used in an actual dialogue can be extracted.

The reason why the second effect is obtained is that a part similar to a question part or an answer part of the question and answer data is detected from accumulated dialogue history data to extract a description of an answer or a question not similar to original question and answer data from the proximity of the part and record the extracted description as index information of the question and answer data.

Thirdly, associated question and answer data can be extracted which are likely to appear in succession in the same dialogue when question and answer data is used in an actual dialogue.

The reason why the third effect is obtained is that similar parts of two question and answer data occurring in succession in accumulated dialogue history data are detected and these question and answer data are recorded as associated question and answer data in index information.

Fourthly, new question and answer data different from existing question and answer data can be extracted from accumulated dialogue history data. Newly editing the new question and answer data and adding the edited data to a question and answer data base makes contents of the question and answer data improved.

The reason why the fourth effect is obtained is that successive descriptions of a question and an answer not similar to the existing question and answer data are extracted from the accumulated dialogue history data and the descriptions of the question and the answer are recorded as new question and answer data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-032379, filed on Feb. 8, 2005, the disclosure of which is incorporated herein in its entirety by reference.

INDUSTRIAL APPLICABILITY

The present invention is applicable for use as a question and answer data editing device for editing/adding FAQ or a collection of questions and answers which is used in operation at a contact center or a call center and for use as a program which realizes a question and answer data editing device on a computer.

Also applicable are as a device for editing/adding an attendance manual for use in sales or reception and a program for realizing an attendance manual editing/adding function on a computer.

Further applicable are as a question and answer data editing device for editing/adding FAQ or a collection of questions and answers based on an electronic bulletin board or chat and a program for realizing a question and answer data editing device on a computer.

The invention claimed is:

1. A question and answer data editing device for editing the content of a dialogue to generate question and answer data, comprising:
   a processor configured to function as at least one of a matching unit and a question and answer variation extraction unit,
   wherein the matching unit detects a first question part or a first answer part from a history data of the content of the dialogue as being similar to a first question and answer data in existing question and answer data; and the question and answer variation extraction unit extracts:
   a) a second answer part from the history data, when a second question part in the history data is similar to the first question and answer data and the second answer part in the history data is not similar to the first question and answer data, and;
   b) a third question part from the history data, when a third answer part in the history data is similar to the first question and answer data and the third question part is not similar to the first question and answer data; and
   registers said third question part or said second answer part from said content of the dialogue as a variation of said first question and answer data in the existing question and answer data.

2. The question and answer data editing device according to claim 1, further comprising a question and answer data editing unit that presents said detected first question part or said first answer part in said content of the dialogue or a portion of said first question part and said first answer part so as to be edited in correlation with said existing question and answer data.

3. A question and answer data editing device for editing the content of a dialogue to generate question and answer data, comprising:
   a processor configured to function as at least one of a matching unit and an associated question and answer extraction unit, wherein the matching unit detects a first question part or a first answer part from said dialogue content similar to a first question and answer data from existing question and answer data; and
   the associated question and answer extraction unit extracts:
   a) a second answer part from a history data, when a second question part in the history data is similar to the first question and answer data and the second answer part in the history data is not similar to the first question and answer data, and;
   b) a third question part from the history data, when a third answer part in the history data is similar to the first question and answer data and the third question part is not similar to the first question and answer data; and
   registers the third question part or the second answer part as associated question and answer data of said first question and answer data,
   wherein the third question part or second answer part adjacent to the first question part or said first answer part in the content of the dialogue.

4. The question and answer data editing device according to claim 3, further comprising a question and answer data editing unit that presents said extracted associated question and answer data so as to be edited in correlation with said existing question and answer data.

5. A question and answer data editing device for editing the content of a dialogue to generate question and answer data, comprising:
   a processor configured to function as at least one of a matching unit, an expression pattern extraction unit, a question and answer variation extraction unit and an associated question and answer variation extraction unit,
   wherein the matching unit detects a first question part or a first answer part from a history data of said dialogue content that is similar to a first question and answer data included in existing question and answer data;
   the expression pattern extraction unit extracts an expression pattern including a context or a condition in which said dialogue was made from the proximity of said first question part or said first answer part, and registers said extracted expression pattern as index information of said first question and answer data;
   the question and answer variation extraction unit extracts a second question part or a second answer part not similar to said first question and answer data from the proximity of said first question part or said first answer part and registers said extracted second question part or second answer part as a variation of said first question and answer data;
   the associated question and answer extraction unit extracts:
   a) a third answer part from the history data, when a third question part in the history data is similar to the first question and answer data and the third answer part in the history data is not similar to the first question and answer data, and;
   b) the third question part from the history data, when the third answer part in the history data is similar to the first question and answer data and the third question part is not similar to the first question and answer data, and;
   registers said third question part or said third answer part as associated question and answer data of said first question and answer data.

6. The question and answer data editing device according to any one of claims 1 to 5 further comprising:
   a dialogue history data base for recording the history data of said dialogue content,
   a question and answer data base for recording existing question and answer data, and
   a matching condition input unit that receives input of conditions of said dialogue content and first question and answer data to be processed, wherein
   said dialogue content and said question and answer data coincident with the input conditions to be processed are read from said dialogue history data base and said question and answer data base.

7. A question and answer data editing method of editing the content of a dialogue to generate question and answer data, comprising:
   detecting a first question part or a first answer part from a history data of the content of the dialogue as being similar to a first question and answer data in existing question and answer data;
   extracting a) a second answer part from the history data, when a second question part in the history data is similar to the first question and answer data and the second answer part in the history data is not similar to the first question and answer data, and b) a third question part from the history data, when a third answer part in the history data is similar to the first question and answer data and the third question part is not similar to the first question and answer data; and registering said third question part or said second answer part from said content of the dialogue as a variation of said first question and answer data.

8. The question and answer data editing method according to claim 7, further comprising a step of presenting said extracted question and answer data in said content of the dialogue or a part of said extracted question and answer data so as to be edited in correlation with said existing question and answer data extracted.

9. A question and answer data editing method of editing the content of a dialogue to generate question and answer data, comprising:

detecting a first question part or a first answer part from history of said dialogue content similar to a first question and answer data from existing question and answer data;

extracting a second question and answer data from the existing question and answer data; and registering the first question and answer data and the second question and answer data as associated question and answer data, wherein the registering occurs in response to a detection of a second question part or second answer part similar to said second question and answer data, the second question part or second answer part adjacent to the first question part or said first answer part in the content of the dialogue.

10. The question and answer data editing method according to claim 9, further comprising a step of presenting said associated question and answer data extracted so as to be edited in correlation with said existing question and answer data.

11. A question and answer data editing method of editing the content of a dialogue to generate question and answer data, comprising:

detecting a first question part or a first answer part from a history data of said dialogue content that is similar to a first question and answer data included in existing question and answer data;

extracting an expression pattern including a context or a condition in which said dialogue was made from the proximity of said first question part or said first answer part;

registering said extracted expression pattern as index information of said first question and answer data;

extracting a) a second answer part from the history data, when the second question part in the history data is similar to the first question and answer data and the second answer part in the history data is not similar to the first question and answer data, and b) a third question part from the history data, when a third answer part in the history data is similar to the first question and answer data and the second question part is not similar to the first question and answer data;

registering said extracted third question part or second answer part as a variation of said first question and answer data; and extracting a second question and answer data from the history data of said dialogue content as associated question and answer data to said first question and answer data in response to detecting that a third question part or a third answer part similar to the extracted second question and answer data is present in the vicinity of the first question part or the first answer part.

12. The question and answer data editing method according to any one of claims 7 to 11 further comprising:

receiving input of conditions of said dialogue content and first question and answer data to be read from a dialogue history data base for recording history data of said dialogue content and a question and answer data base for recording existing question and answer data and to be processed, and reading said dialogue content and said question and answer data coincident with the input conditions from said dialogue history data base and said question and answer data base.

13. A non-transitory computer readable medium storing a question and answer data editing program for causing a computer to execute a method of editing content of a dialogue to generate question and answer data, the method comprising:

detecting a first question part or a first answer part from a history data of the content of the dialogue as being similar to a first question and answer data in existing question and answer data;

extracting a) a second answer part from the history data, when a second question part in the history data is similar to the first question and answer data and a second answer part in the history data is not similar to the first question and answer data, and b) a third question part from the history data, when a third answer part in the history data is similar to the first question and answer data and the third question part is not similar to the first question and answer data; and registering said third question part or said second answer part from said content of the dialogue as a variation of said first question and answer data.

14. The non-transitory computer readable medium according to claim 13, wherein said question and answer data editing program further comprising a function of presenting said extracted question and answer data in said content of the dialogue or a part of said extracted question and answer data so as to be edited in correlation with said existing question and answer data extracted.

15. A non-transitory computer readable medium storing a question and answer data editing program for causing a computer to execute a method of editing content of a dialogue to generate question and answer data, said method comprising:

detecting a first question part or a first answer part from history of said dialogue content similar to a first question and answer data from existing question and answer data;

extracting a second question and answer data from the existing question and answer data; and registering the first question and answer data and the second question and answer data as associated question and answer data, wherein the registering occurs in response to a detection of a second question part or second answer part similar to said second question and answer data, the second question part or second answer part adjacent to the first question part or said first answer part in the content of the dialogue.

16. A non-transitory computer readable medium storing a question and answer data editing program for causing a computer to execute a method of editing the content of a dialogue to generate question and answer data, said method comprising:

detecting a first question part or a first answer part from a history data of said dialogue content that is similar to a first question and answer data included in existing question and answer data;

extracting an expression pattern including a context or a condition in which said dialogue was made from the proximity of said first question part or said first answer part;

registering said extracted expression pattern as index information of said first question and answer data;

extracting a) a second answer part from the history data, when a second question part in the history data is similar to the first question and answer data and a second answer part in the history data is not similar to the first question and answer data, and b) a third question part from the history data, when a third answer part in the history data is similar to the first question and answer data and the third question part is not similar to the first question and answer data;

registering said extracted third question part or second answer part as a variation of said first question and answer data; and extracting a second question and answer data from the history data of said dialogue content as associated question and answer data to said first question and answer data in response to detecting that a third question part or a third answer part similar to the extracted second question and answer data is present in the vicinity of the first question part or the first answer part.

17. The non-transitory computer readable medium according to any one of claims 13 to 16, wherein first question and answer data editing program further comprising the functions of:

receiving input of conditions of said dialogue content and said question and answer data to be read from a dialogue history data base for recording history data of said dialogue content and a question and answer data base for recording existing question and answer data and to be processed, and reading said dialogue content and said question and answer data coincident with the input conditions from said dialogue history data base and said question and answer data base.

18. A dialogue supporting device for supporting a dialogue by using said generated question and answer data or said index information which is generated by the question and answer data editing device according to claim 5.

19. A dialogue supporting method of supporting a dialogue by using said generated question and answer data or said index information which is generated by the question and answer data editing method according to claim 11.

20. A dialogue supporting non-transitory computer readable medium for causing said computer to execute a function of supporting a dialogue by using said generated question and answer data or said index information which is generated by the question and answer data editing program according to claim 16.

* * * * *